United States Patent [19]
Abe et al.

[11] Patent Number: 5,640,428
[45] Date of Patent: Jun. 17, 1997

[54] DIRECT CONVERSION RECEIVER

[75] Inventors: Katsuaki Abe, Kawasaki; Masahiro Mimura; Makoto Hasegawa, both of Tokyo; Kazunori Watanabe; Katsushi Yokozaki, both of Yokohama, all of Japan

[73] Assignee: Matsushita Electric Industrial Co, Ltd., Japan

[21] Appl. No.: 555,407

[22] Filed: Nov. 9, 1995

[30] Foreign Application Priority Data

Nov. 10, 1994 [JP] Japan .................. 6-276440
Nov. 10, 1994 [JP] Japan .................. 6-276441

[51] Int. Cl.$^6$ .................. H03D 3/00; H04L 27/14
[52] U.S. Cl. .................. 375/334; 375/328
[58] Field of Search .................. 375/334, 324, 375/328, 272; 329/315, 327, 343, 303, 300

[56] References Cited

U.S. PATENT DOCUMENTS

| | | | |
|---|---|---|---|
| 4,475,219 | 10/1984 | Puckette | 375/334 |
| 4,651,107 | 3/1987 | Akaiwa | 375/328 |
| 4,752,742 | 6/1988 | Akaiwa | 375/328 |
| 5,309,113 | 5/1994 | Mimura et al. | 375/324 |
| 5,345,187 | 9/1994 | McGuire | 375/334 |
| 5,446,762 | 8/1995 | Ohba et al. | 375/334 |
| 5,485,108 | 1/1996 | Kojima | 327/8 |

FOREIGN PATENT DOCUMENTS 2189114  3/1990  United Kingdom .

*Primary Examiner*—Stephen Chin
*Assistant Examiner*—Betsy L. Deppe
*Attorney, Agent, or Firm*—Rossi & Associates

[57] ABSTRACT

In a first direct conversion receiver for demodulating I and Q signals, having a quadrature relation therebetween, obtained from a received FSK signal through a direct conversion, a first D FF latches a level of the I signal when a sign condition of I and Q signals moves from the same to different sign conditions, a second D FF latches a level of the Q signal when the sign condition of the I and Q signals moves from the different to same sign condition and EXCLUSIVE OR operations are made among the I and Q signals and the outputs of the first and second D FFs to provide a frequent data judgement to improve a receiving sensitivity of an FSK signal having a relative low modulation index. In a second direct conversion receiver, a sign change in the Q signal is detected by a first edge detection circuit 17, a first D FF holds the level of the I signal, and an EXCLUSIVE OR circuit provides a first demodulation result. A sign change in the I signal is detected by a second edge detection circuit 17, a second D FF holds the level of the Q signal, an EXCLUSIVE OR circuit provides a second demodulation result and a subtracting circuit combines the first and second demodulation results. An earlier change detection circuit also combines the first and second demodulation results with a delay in the first and second demodulation results reduced.

10 Claims, 16 Drawing Sheets

FIG. 3

| SIGN CHG (I, Q) → (I', Q') | OUTPUT |
|---|---|
| (0, 0) → (0, 0) | — |
| (0, 0) → (0, 1) | 1 |
| (0, 0) → (1, 0) | 0 |
| (0, 0) → (1, 1) | — |
| (0, 1) → (0, 0) | 0 |
| (0, 1) → (0, 1) | — |
| (0, 1) → (1, 0) | — |
| (0, 1) → (1, 1) | 1 |
| (1, 0) → (0, 0) | 1 |
| (1, 0) → (0, 1) | — |
| (1, 0) → (1, 0) | — |
| (1, 0) → (1, 1) | 0 |
| (1, 1) → (0, 0) | — |
| (1, 1) → (0, 1) | 0 |
| (1, 1) → (1, 0) | 1 |
| (1, 1) → (1, 1) | — |

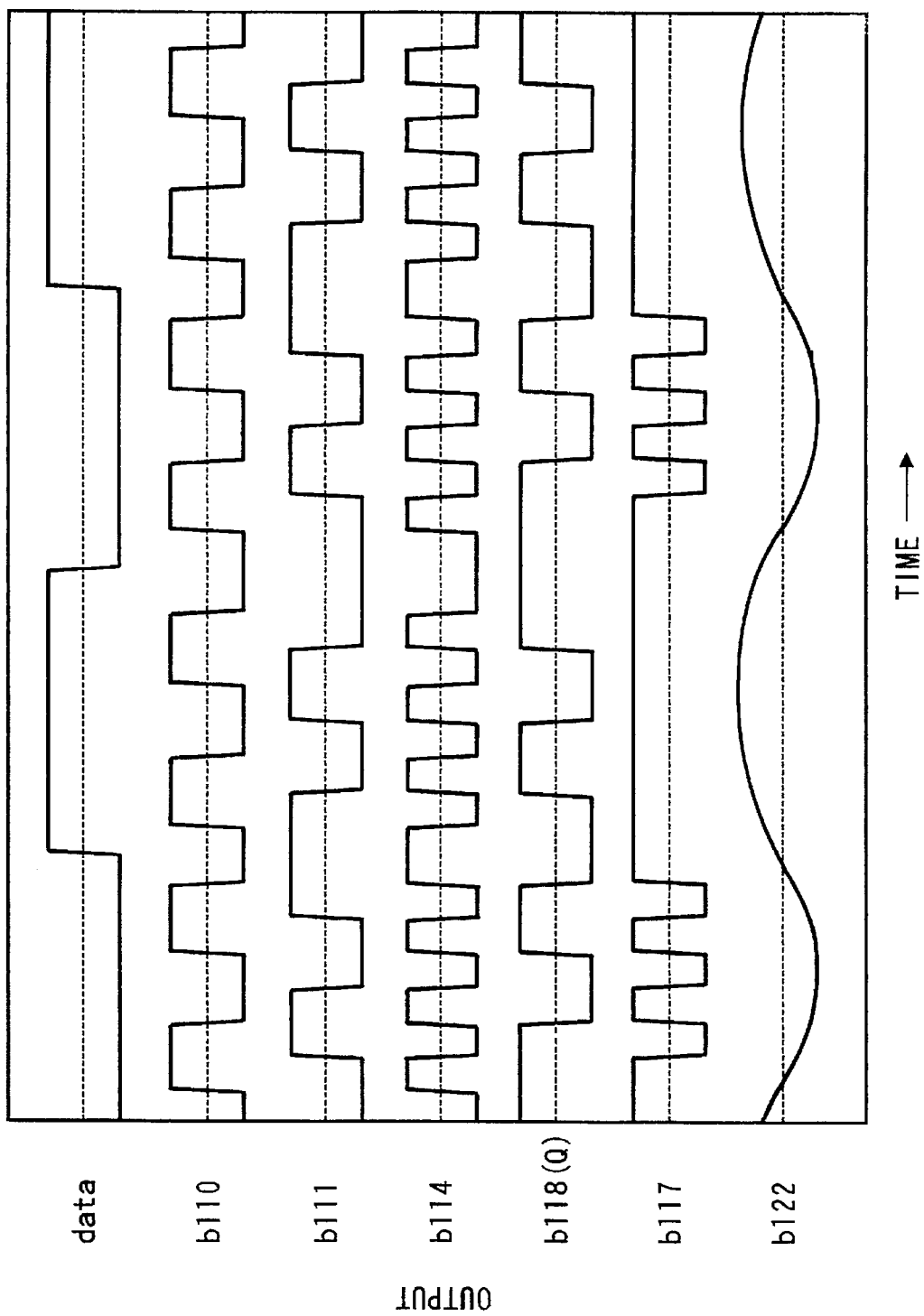

DIRECT CONVERSION RECEIVER

BACKGROUND OF THE INVENTION

1. Field of the Invention

This invention relates to a direct conversion receiver for receiving a digital modulation radio wave signal.

2. Description of the Prior Art

A direct conversion receiver for receiving a radio wave signal modulated by a digital modulation method, such as a frequency shift keying (FSK) is known. Such a prior art direct conversion receiver is disclosed in Japanese patent application provisional publication No. 55-14701. FIG. 17 is a block diagram of a prior art direct conversion receiver. A received FSK signal 101 is supplied to mixers 102 and 103. A local oscillator 104 generates a local oscillation signal having a frequency which is substantially the same as a carrier frequency of the FSK signal. The local oscillation signal is supplied to a 90° phase shifter distributor 105. The 90° phase shifter distributor 105 supplies the local oscillation signal to the mixer 102 and a 90° phase shifted oscillation signal to the mixer 103, wherein it is assumed that the local oscillation signal supplied to the mixer 102 leads the 90° phase shifted local oscillation signal supplied to the mixer 103 by a phase angle 90°. The mixer 102 mixes the received FSK signal 101 with the local oscillation signal and the mixer 103 mixes the received FSK signal 101 with the 90° phase shifted local oscillation signal. The outputs of the mixers 102 and 103 are supplied to amplitude limiting amplifiers 110 and 111 through low pass filters 108 and 107 (analog I signal 108 and analog Q signal 109) respectively. The amplitude limiting amplifier 110 amplifies the output of the low pass filter 106 with amplitude limitation to supply a digital in-phase base band signal 112 (digital I signal). The amplitude limiting amplifier 111 amplifies the output of the low pass filter 107 with amplitude limitation to supply a digital quadrature base band signal 113 (digital Q signal). The digital I and Q signals have a quadrature phase relation which is inverted by the frequency shift of the FSK signal.

In this case, assuming that when the digital Q signal leads the digital I signal, data in the FSK signal shows logic H level and when the digital Q signal lags the digital I signal, data in the FSK signal shows logic L level. The I signal is supplied to a clock input of a D flip flop circuit 901 and the Q signal is supplied to a D input of the D flip flop circuit 901. An output of the D flip flop circuit 901 is supplied to a low pass filter 902 to obtain a final demodulated output of the FSK signal.

However, there is a problem that in that prior art direct conversion receiver, because a judgement of data is made only at a rising edge of the digital I signal, a change of data cannot be detected until the next rising edge of the digital I signal occurs. Thus, there is a delay in the Judgement of data. Moreover, if there is an error in the judgement of data due to a variation in the digital I signal due to a noise or the like, the judgement of data remains erroneous until the next rising edge of the digital I signal occurs and the possibility that the low pass filter outputs an erroneous final output result. This problem becomes more severe with a decrease in the modulation index.

SUMMARY OF THE INVENTION

The aim of the present invention is to provide an improved direct conversion receiver.

Further, the aim of this invention is to improve a receiving sensitivity of an FSK signal having a low modulation index by making the judging of data at changes of data in both I and Q signals to make a delay in the judgement of data from the original change of data as small as possible and by reducing an affection of the change of data due to a noise or the like.

In a first direct conversion receiver for demodulating I and Q signals, having a quadrature relation therebetween, obtained from a received frequency shift keying signal through a direct conversion, a first D FF (flip flop circuit) latches a level of the I signal when a sign condition of the I and Q signals moves from the same to different sign conditions, a second D FF latches a level of the Q signal when the sign condition of the I and Q signals moves from a different to the same sign conditions and EXCLUSIVE OR operations are made among the I and Q signals and the outputs of the first and second D FFs to provide a frequent data judgement to improve a receiving sensitivity of the FSK signal having a relative low modulation index.

In a second direct conversion receiver, a sign change in the Q signal is detected by a first edge detection circuit, a first D FF holds the level of the I signal, and an EXCLUSIVE OR circuit provides a first demodulation result. A sign change in the I signal is detected by a second edge detection circuit 17, a second D FF holds the level of the Q signal, an EXCLUSIVE OR circuit provides a second demodulation result and a subtracting circuit combines the first and second demodulation result. An earlier change detection circuit also combines the first and second demodulation result with a delay in the first and second demodulation results reduced.

According to the present invention there is provided a third direct conversion receiver for demodulating first and second digital signals, having a quadrature relation therebetween, obtained from a received frequency shift keying signal through a direct conversion comprising: a first EXCLUSIVE OR circuit for effecting a first EXCLUSIVE OR operation between the first and second digital signals; a first D flip flop circuit for holding a level of the first digital signal in response to a rising edge of an output of the first EXCLUSIVE OR circuit; a second D flip flop circuit for holding a level of the second digital signal in response to a falling edge of the output of the first EXCLUSIVE OR circuit; a second EXCLUSIVE OR circuit for effecting a second EXCLUSIVE OR operation between the first digital signal and an output of the second D flip flop circuit; a third EXCLUSIVE OR circuit for effecting a third EXCLUSIVE OR operation between the second digital signal and an output of the first D flip flop circuit; and a fourth EXCLUSIVE OR circuit for effecting a fourth EXCLUSIVE OR operation between outputs of the second and third EXCLUSIVE OR circuits to output a demodulation result.

The third direct conversion receiver may further comprise a low pass filter for low-pass filtering the demodulation result. Moreover, in the third direct conversion receiver, the frequency shift keying signal may be subjected to multi-value frequency shift keying and the direct conversion receiver may further comprise: a frequency to a voltage converting circuit and a comparing circuit for comparing an output of the voltage converting circuit with at least a reference voltage and outputting another demodulation result, the demodulation result and the another demodulation result providing demodulation of the multi-value frequency shift keying.

According to this invention there is provided a fourth direct conversion receiver for demodulating first and second digital signals, having a quadrature relation therebetween, obtained from a received frequency shift keying signal through a direct conversion comprising: a first EXCLUSIVE OR circuit for effecting a first EXCLUSIVE OR operation between the first digital signal and the second digital signal; a D flip flop circuit for holding a level of the first digital signal in response to a rising edge of an output of the first EXCLUSIVE OR circuit; a second EXCLUSIVE OR circuit for effecting a second EXCLUSIVE OR operation between an output of the D flip flop circuit and the second digital signal; a low pass filter circuit for integrating an output of the fourth EXCLUSIVE OR circuit; and a high pass filter circuit for removing a dc component from an output of the low pass filter circuit and outputting a demodulation result.

According to this invention there is provided a fifth direct conversion receiver for demodulating first and second digital signals, having a quadrature relation therebetween, obtained from a received frequency shift keying signal through a direct conversion comprising: a first EXCLUSIVE OR circuit for effecting a first EXCLUSIVE OR operation between the first and second digital signals; a D flip flop circuit for holding a level of the second digital signal in response to a falling edge of an output of the first EXCLUSIVE OR circuit; a second EXCLUSIVE OR circuit for effecting a second EXCLUSIVE OR operation between an output of the D flip flop circuit and the second digital signal; a low pass filter circuit for integrating an output of the second EXCLUSIVE OR circuit; and a high pass filter circuit for removing a dc component from an output of the low pass filter circuit and outputting a demodulation result.

According to this invention there is provided a sixth direct conversion receiver for demodulating first and second analog signals, having a quadrature relation therebetween, obtained from a received frequency shift keying signal through a direct conversion comprising: a first multiplier for multiplying the first analog signal with the second analog signal; a first delay circuit for delaying an output of the first multiplier by a delay time corresponding to $\pi/4$ of a deviation frequency of the received frequency shift keying signal; a first holding circuit for holding a level of the first analog signal when a polarity of an output of the first delay circuit changes from a negative polarity to a positive polarity; a second holding circuit for holding a level of the second analog signal when a polarity of an output of the first delay circuit changes from a positive polarity to a negative polarity; a second delay circuit for delaying the first analog signal by the delay time; a third delay circuit for delaying the second analog signal by the delay time which is equal to the delay times of the first and second delay circuits; a second multiplier for multiplying an output of the second delay circuit with an output of the second holding circuit; a third multiplier for multiplying an output of the third delay circuit with an output of the first holding circuit; a fourth multiplier for multiplying an output of the second multiplier with an output of the third multiplier; and a low pass filter for removing a dc component from an output of the fourth multiplier to provide a demodulation result.

According to this invention, there is also provided a seventh direct conversion receiver for demodulating first and second digital signals, having a quadrature relation therebetween, obtained from a received frequency shift keying signal through a direct conversion comprising: an edge detection circuit for detecting an edge in the second digital signal; a holding circuit for holding a level of the first digital signal in response to an output of the edge detection circuit; an EXCLUSIVE OR circuit for effecting an EXCLUSIVE OR operation between the second digital signal and an output of the holding circuit to provide a demodulation result. Moreover, the seventh direct conversion receiver may further comprise: a second edge detection circuit for detecting an edge in the first digital signal; a second holding circuit for holding a level of the second digital signal in response to an output of the second edge detection circuit; a second EXCLUSIVE OR circuit for effecting an EXCLUSIVE OR operation between the first digital signal and an output of the second holding circuit to provide a second demodulation result; and a combining circuit, including a subtracting circuit, for effecting a subtraction between the demodulation result and the second demodulation result to combine the first and second demodulation results.

According to this invention there is provided an eighth direct conversion receiver for demodulating first and second digital signals, having a quadrature relation therebetween, obtained from a received frequency shift keying signal through a direct conversion comprising: a first edge detection circuit for detecting an edge in the second digital signal; a first holding circuit for holding a level of the first digital signal in response to an output of the first edge detection circuit; a first EXCLUSIVE OR circuit for effecting a first EXCLUSIVE OR operation between the second digital signal and an output of the first holding circuit to provide a first demodulation result; a second edge detection circuit for detecting an edge in the first digital signal; a second holding circuit for holding a level of the second digital signal in response to an output of the second edge detection circuit; a second EXCLUSIVE OR circuit for effecting a second EXCLUSIVE OR operation between the first digital signal and an output of the second holding circuit to provide a second demodulation result, either the first demodulation result leading the second demodulation result by a phase difference between the first and second digital signals or the second demodulation result leading the first demodulation result by the phase; an earlier change detection circuit for detecting a change in the first and second demodulation results and outputting a third demodulation result such that when the first demodulation result leads the second demodulation result by the phase difference, the earlier change detection circuit outputs the first demodulation result as a third demodulation result and when the second demodulation result leads the first demodulation result by the phase difference, the earlier change detection circuit outputs the second demodulation result as the third demodulation result.

Moreover, in the eighth direct conversion receiver, the earlier change detection circuit may comprise: a first inverter for inverting the second demodulation result; a third EXCLUSIVE OR circuit for effecting a third EXCLUSIVE OR operation between the first demodulation result and an output of the first inverter; a second inverter for inverting an output of the third EXCLUSIVE OR circuit; a holding circuit for holding either of the first or second result in response to an output of the second inverter; and a fourth EXCLUSIVE OR circuit for effecting a fourth EXCLUSIVE OR operation between an output of the holding circuit and the output of the third EXCLUSIVE OR circuit.

BRIEF DESCRIPTION OF THE DRAWINGS

The object and features of the present invention will become more readily apparent from the following detailed description taken in conjunction with the accompanying drawings in which:

FIG. 3 is a drawing of a table of the first embodiment showing a relation between the I and Q signals and the demodulation output;

FIG. 5 is a drawing of a time chart illustrating the operation of the direct conversion receiver of the second embodiment;

The same or corresponding elements or parts are designated with like references throughout the drawings.

DETAILED DESCRIPTION OF THE INVENTION

Hereinbelow will be described a first embodiment of this invention.

Figure 1:
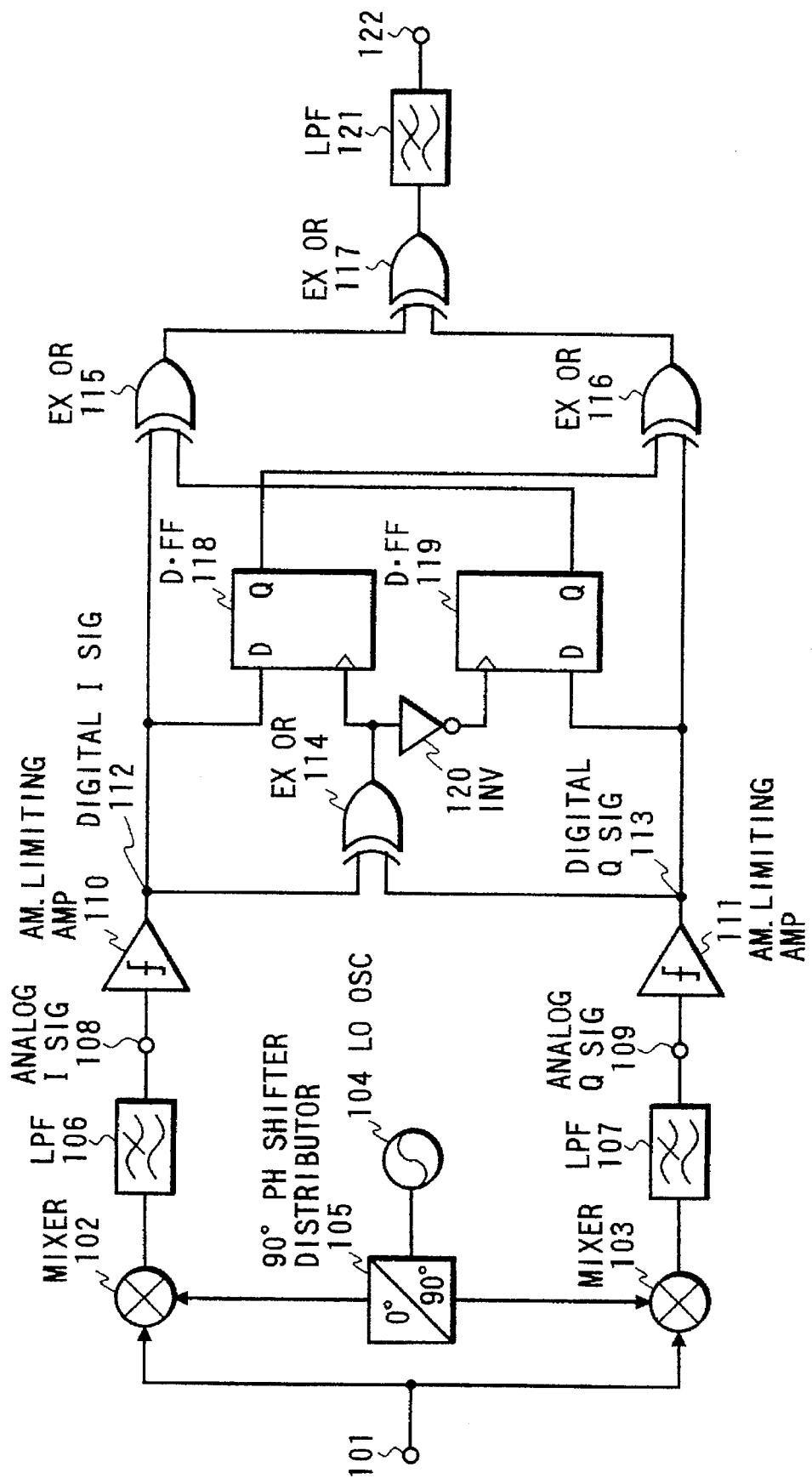
FIG. 1 is a block diagram of a first embodiment of a direct conversion receiver.
Figure 2:
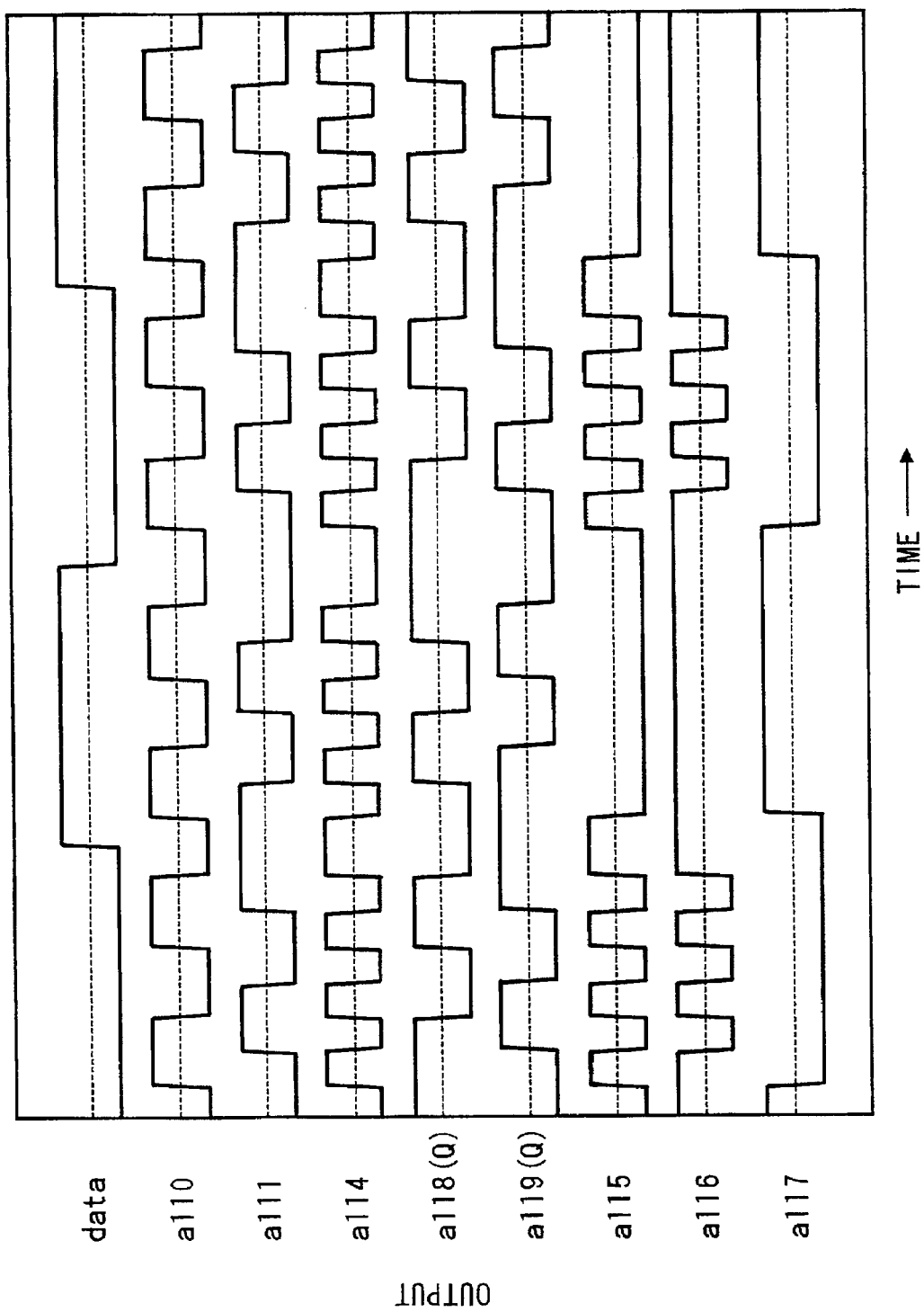
FIG. 2 is a diagram of a time chart of the first embodiment.

FIG. 1 is a block diagram of the first embodiment of a direct conversion receiver. FIG. 2 is a diagram of a time chart of the first embodiment. In FIG. 2, waveforms represent outputs of circuits shown in FIG. 1 with references respectively corresponding to references of those circuits. A received FSK signal 101 is supplied to mixers 102 and 103. A local oscillator 104 generates a local oscillation signal having a frequency which is substantially the same as a carrier frequency of the FSK signal. The local oscillation signal is supplied to a 90° phase shifter distributor 105. The 90° phase shifter distributor 105 supplies the local oscillation signal to the mixer 102 and a 90° phase shifted local oscillation signal to the mixer 103, wherein it is assumed that the local oscillation signal supplied to the mixer 102 leads the 90° phase shifted local oscillation signal supplied to the mixer 103 by a phase angle 90°. The mixer 102 mixes the received FSK signal 101 with the local oscillation signal and the mixer 103 mixes the received FSK signal 101 with the 90° phase shifted local oscillation signal. The outputs of the mixers 102 and 103 are supplied to low pass filters 106 and 107 respectively. The low pass filters 106 and 107 remove unnecessary high frequency components from the output of the mixers 102 and 103 respectively. Outputs of the low pass filters 106 and 107 are analog I and Q signals 108 and 109 and are supplied to limiting amplifiers 110 and 111 respectively. The amplitude limiting amplifier 110 amplifies the output of the low pass filter 106 with amplitude limitation to supply a digital in-phase base band signal (digital I signal) 112. The amplitude limiting amplifier 111 amplifies the output of the low pass filter 107 with amplitude limitation to supply a digital quadrature base band signal (digital Q signal) 113. The I and Q signals have a quadrature phase relation which is inverted in accordance with the frequency shift of the FSK signal.

The output of the amplitude limiting amplifier 110 (I signal) is supplied to a first input of an EXCLUSIVE OR circuit 114, a D input of a D flip flop circuit 118, and a first input of an EXCLUSIVE OR circuit 115. The output of the amplitude limiting amplifier 111 (Q signal) is supplied to a second input of the EXCLUSIVE OR circuit 114, a D input of a D flip flop circuit 119, and a second input of an EXCLUSIVE OR circuit 116. An output of the EXCLUSIVE OR circuits 114 is supplied to a clock input of the D flip flop circuit 118 and to a clock input of the EXCLUSIVE OR circuit 119 through an inverter 120. A Q output of the D flip flop circuit 118 is supplied to a first input of the EXCLUSIVE OR circuit 116. A Q output of the D flip flop circuit 119 is supplied to a second input of the EXCLUSIVE OR circuit 115. An output of the EXCLUSIVE OR circuit 115 is supplied to a first input of an EXCLUSIVE OR circuit 117 and an output of the EXCLUSIVE OR circuit 116 is supplied to a second input of the EXCLUSIVE OR circuit 117. An output of the EXCLUSIVE OR circuit 117 is supplied to a low pass filter 121 to remove unnecessary high frequency components. An output of the low pass filter 121 is outputted as a demodulation output from a terminal 122.

The Q and I signals are obtained as described above. An operation of obtaining the modulation outputs with the digital I and Q signals will be described.

The EXCLUSIVE OR circuit 114 executes an EXCLUSIVE OR operation between the I signals 112 and Q signals 113 as shown by waveform a114. The output of the EXCLUSIVE OR circuit 114 is supplied to the clock input of the D flip flop circuit 118 and the clock input of the D flip flop 119 through the inverter 120 for effecting an inverting operation.

The EXCLUSIVE OR circuit 114 outputs logic L when the digital I signal and the digital Q signals are in a same sign condition, that is, a logic level of the digital I signal 112 is equal to the logic level of the digital Q signal 113 and outputs logic H when the digital I signal and the digital Q signal are in a different sign condition, that is, the logic level of the digital I signal 112 is different from the logic level of the digital Q signal 113. Therefore, the D flip flop circuit 118 holds and outputs the logic level of the digital I signal 112 when the sign condition of the digital I and Q signal changes from the same sign condition to the different sign condition as shown by waveform a118. On the other hand, the D flip flop circuit 119 holds and outputs the logic level of the digital Q signal 113 when the sign condition of the digital I and Q signal changes from the different sign condition to the same sign condition because of the inverter 120, as shown by waveform a119.

The EXCLUSIVE OR circuit 115 executes an EXCLUSIVE OR operation between the Q output of the D flip flop circuit 119 and the digital I signal 112 and the result is supplied to the first input of the EXCLUSIVE OR circuit 117 as shown by waveform a115. The EXCLUSIVE OR circuit 116 executes an EXCLUSIVE OR operation between the Q output of the D flip flop circuit 118 and the digital Q signal 113 and the result is supplied to the second input of the EXCLUSIVE OR circuit 117 as shown by waveform a116.

At first, an operation when the sign condition of the digital I and Q signals 112 and 113 changes from the same sign condition to the different condition will be described.

This condition means that a phase of one of digital I signal 112 and Q signal 113 of which sign changes leads the other signal. When the sign condition of the digital I signal 112 and the digital Q signals 113 changes from the same sign condition to the different sign condition, the EXCLUSIVE OR circuit 114 outputs logic H. Then, the clock input signal of the D flip flop 118 rises, so that the D flip flop 118 holds the logic level of the I signal and outputs the held level at the Q output thereof. In this operation, because the rising timing of the clock input signal of the D flip flop 118 delays from the timing of the changing of signs of the digital I and Q signals 112 and 113 by the delay time in the EXCLUSIVE OR circuit 114 as shown by waveform a118. Thus, the D flip flop 118 latches the logic level of the digital I signal 112 after the transition of the digital I or Q signal 112 or 113. Accordingly, the operation in the EXCLUSIVE OR circuit 116 is equivalent to the EXCLUSIVE OR operation between the digital I and Q signals in the different sign condition, so that the EXCLUSIVE OR circuit 116 outputs logic H.

In the D flip flop circuit 119, there is no rising edge in the clock input thereof, at the Q output thereof the logic level is kept as the logic level was in the same sign condition as shown in by waveform a119. Therefore, the logic level of the output of the EXCLUSIVE OR circuit 115 depends on whether the change in the level occurs in the digital I signal 112 or the digital Q signal 113. If the digital I signal 112 changes, signs of inputs of the EXCLUSIVE OR circuit 115 is different each other, so that the EXCLUSIVE OR circuit 115 outputs logic H. If the digital Q signal 113 changes, the inputs of the EXCLUSIVE OR circuit 115 does not change, so that the output of the EXCLUSIVE OR circuit 115 outputs logic L as described later.

As mentioned above, when the sign condition of the digital I and Q signals 112 and 113 changes from the same sign condition to the different sign condition by changing of the logic level of the digital I signal 112, both input signals of the EXCLUSIVE OR circuit 117 are logic H, so that EXCLUSIVE OR circuit 117 outputs logic L. This condition matches to the data when the I signal 112 leads the Q signal 113. On the other hand, when the sign condition of the digital I and Q signals 112 and 113 changes from the same sign condition to the different sign condition by changing of the logic level of the digital Q signal 113, the inputs signals of the EXCLUSIVE OR circuit 117 are logic H and logic L, so that EXCLUSIVE OR circuit 117 outputs logic H. This condition matches to the data when the Q signal 113 leads the I signal 112.

Then, an operation when the sign condition of the digital I and Q signals 112 and 113 changes from the different sign condition to the same condition will be described.

This condition means that a phase of one of digital Q signal 112 and I signal 113 of which sign changes, lags the other signal. When the sign condition of the digital I signal 112 and the digital Q signals 113 changes from the different sign condition to the same sign condition, the EXCLUSIVE OR circuit 114 outputs logic L. Then, the clock input signal of the D flip flop 119 rises because of the inverter 120, so that the D flip flop 119 holds the logic level of the digital Q signal 113 and outputs the held level at the Q output thereof.

Then, the EXCLUSIVE OR circuit 115 effects an operation equivalent to the EXCLUSIVE OR operation between the digital I and Q signals in the same sign condition, so that the EXCLUSIVE OR circuit 115 outputs logic L.

In the D flip flop circuit 118, there is no rising edge in the clock input thereof, at the Q output thereof the logic level is kept as the logic level was in the different sign condition. Therefore, the logic level of the output of the EXCLUSIVE OR circuit 116 depends on whether the change in the level occurs in the digital I signal 112 or the digital Q signal 113. If the digital I signal 112 changes, signs of inputs of the EXCLUSIVE OR circuit 116 are different each other as they are, so that the EXCLUSIVE OR circuit 116 outputs logic H. If the digital Q signal 113 changes, the inputs of the EXCLUSIVE OR circuit 116 have the same sign, so that the output of the EXCLUSIVE OR circuit 116 outputs logic L as described later.

As mentioned above, when the sign condition of the digital I and Q signals 112 and 113 changes from the different sign condition to the same sign condition by changing of the logic level of the digital I signal 112, the input signals of the EXCLUSIVE OR circuit 117 are logic L and logic H so that EXCLUSIVE OR circuit 117 outputs logic H. This condition matches to the data when the I signal 112 lags the Q signal 118. On the other hand, when the sign condition of the digital I and Q signals 112 and 113 changes from the different sign condition to the same sign condition by changing of the logic level of the digital Q signal 113, both input signals of the EXCLUSIVE OR circuit 117 are logic L, so that EXCLUSIVE OR circuit 117 outputs logic L. This condition matches to the data when the Q signal 113 lags the I signal 112.

An operation when both digital I signal 112 and the digital Q signal 113 change at the same time due to a noise or the like will be described.

When both digital I signal 112 and the digital Q signal 113 change at the same time, the output level of the EXCLUSIVE OR circuit 114 does not change, so that the both Q outputs of the D flip flop circuits 118 and 119 do not change. The output level of the EXCLUSIVE OR circuits 115 and 116 are inverted by the change of the digital I signal 112 and the digital Q signal 113. However, the output level of the EXCLUSIVE OR circuit 117 does not change. Therefore, when both digital I signal 112 and the digital Q signal 113 changes at the same times, this circuit keeps the condition before the change.

As mentioned above, the EXCLUSIVE OR circuit 117 outputs logic L when the digital I signal 112 leads the digital Q signal 113 and logic H when the digital I signal 112 lags the digital Q signal 113. The output of the EXCLUSIVE OR circuit 117 is supplied to the low pass filter 121 to remove a variation due to noises to provide the demodulation output 122. FIG. 3 is a drawing of a table of the first embodiment showing a relation between the I and Q signal and the demodulation output.

As mentioned above, the demodulation output is obtained using the values of the I digital signal 112 and the Q digital signal 113 when the digital I signal 112 and the digital Q signal 113 change from the same sign condition to the different sign condition or from the different sign condition to the same sign condition. Therefore, the judgement of demodulation is frequent and the delay time of demodulation output from the original data change can be reduced and the variation of the data due to noise can be prevented. Accordingly, a receiving sensitivity of an FSK signal having a low modulation index can be improved.

In this invention, it is assumed that the I signal shows logic L when the digital I signal 112 leads the digital Q signal 113. However, if it is assumed that the I signal shows logic H when the digital I signal 112 leads the digital Q signal 113, an inverter is provided between the EXCLUSIVE OR circuit 117 and the low pass filter 121.

A second embodiment will be described.

Figure 4A:
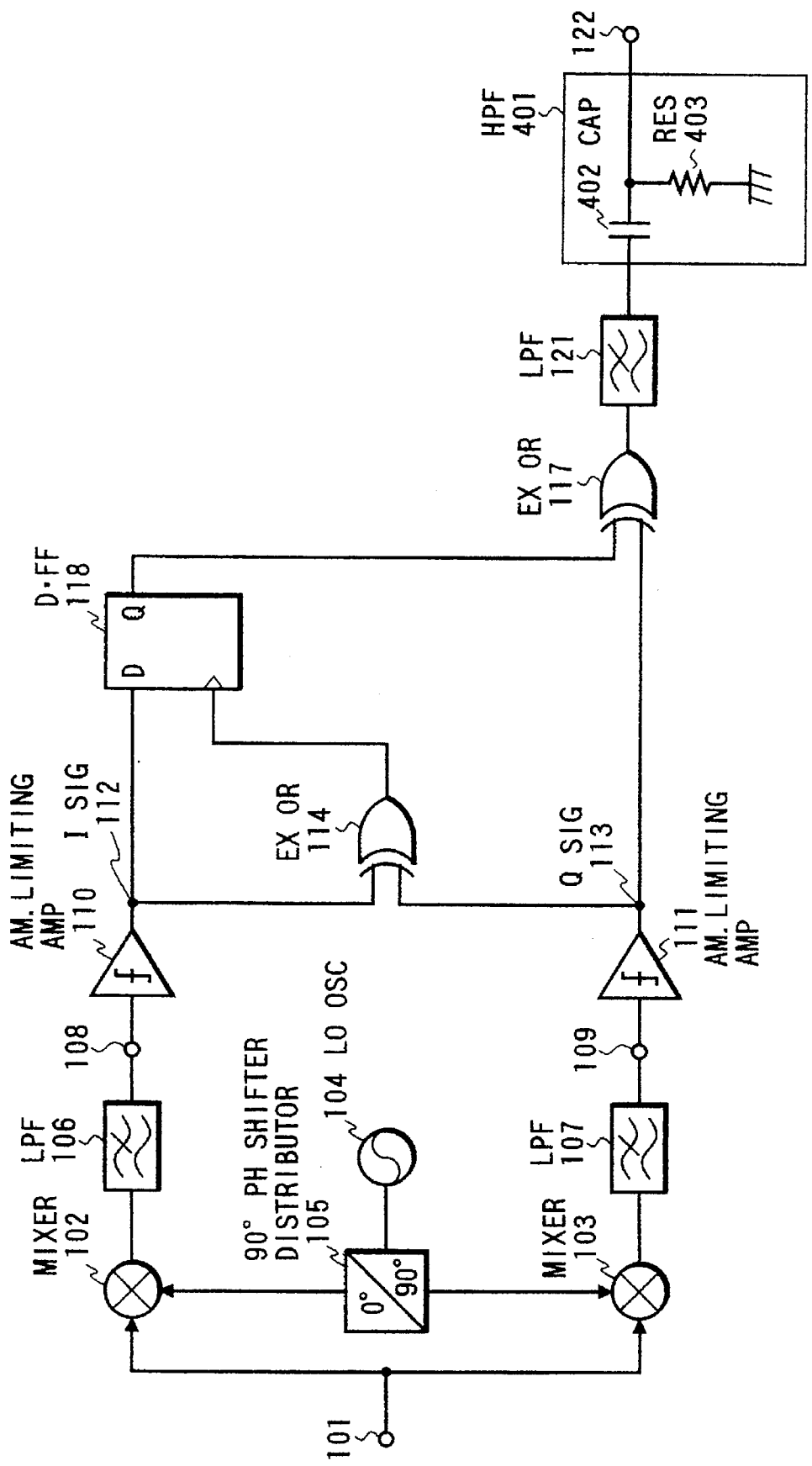
FIG. 4A is a block of a second embodiment of a direct conversion receiver.

FIG. 4A is a block of the second embodiment of a direct conversion receiver and FIG. 5 is a drawing of a time chart of the second embodiment for illustrating the operation of the direct conversion receiver of the second embodiment. In FIG. 5, waveforms represent outputs of circuits shown in FIG. 4A with references respectively corresponding to references of those circuits. The difference in the structure between the first and second embodiments is in that the EXCLUSIVE OR circuits 115 and 116 and the D flip flop circuit 119 are omitted and the first input of the EXCLUSIVE OR circuit 117 is supplied with the output of the D flip flop circuit 118 and the second input of the EXCLUSIVE OR circuit 117 is supplied with the digital Q signal 113 and a high pass filter 401 is further provided after the low pass filter 121 to remove a dc component in the output of the low pass filter 121. In this embodiment, the high pass filter 401 comprises a capacitor 402 having a first end connected to the output of the low pass filter 121 and a second end connected to the demodulation output terminal 122 and a resistor 403 having a first end connected to the second end of the capacitor 402 and a second end grounded.

An operation of demodulation from the digital I signal 112 and the digital Q signal 112 with the structure of the second embodiment.

The EXCLUSIVE OR circuit 114 executes an operation of EXCLUSIVE OR between the digital I signal 112 and the digital Q signal 113 as shown by waveform b114 and outputs logic L when the digital I signal 112 and the digital Q signal are in the same sign condition and outputs logic H when the digital I signals 112 and the digital Q signal are in the different sign condition. The clock input of the D flip flop circuit 118 is supplied with the output of the EXCLUSIVE OR circuit 114 which rises when the same sign condition to the different condition of the digital I signal 112 and the digital Q signal 113 and this timing, a logic level at the D input of the D flip flop circuit 118, namely, the level of the digital I signal 112 is held and outputted at the Q output thereof.

The EXCLUSIVE OR circuit 117 executes an operation of EXCLUSIVE OR between the Q output of the D flip flop circuit 118 and the digital Q signal 113 and outputs logic H when the sign condition of the digital I signal 112 and the digital Q signal changes from the same sign condition to the difference condition, the signs of the first and second input of the EXCLUSIVE OR circuit 117 are different each other, so that the EXCLUSIVE OR circuit 117 outputs logic H. Then, when the sign condition of the digital I signal 112 and the digital Q signal 113 changes from the different sign condition to the same condition and the digital signal I 112 changes its sign, the signs of the first and second input of the EXCLUSIVE OR circuit 117 do not change, so that the output of the EXCLUSIVE OR circuit 117 remains logic H. On the other hand, when the sign condition of the digital I signal 112 and the digital Q signal 113 changes from the different sign condition to the same condition and the digital signal Q 113 changes its sign, the signs of the first and second input of the EXCLUSIVE OR circuit 117 change from the different sign condition to the same condition, so that the EXCLUSIVE OR circuit 117 outputs logic L. FIG. 5 shows this operation clearly.

The output of the EXCLUSIVE OR circuit 117 is integrated by the low pass filter 121 and a dc component In the output of the low pass filter 121 is removed by the high pass filter 401 and the demodulation output 122 is obtained as shown by waveform b122 in FIG. 5.

As mentioned above, the demodulation output is obtained using the values of the I digital signal 112 and the Q digital signal 113 when the digital I signal 112 and the digital Q signal 113 change from the same signal condition to the different sign condition or from the different sign condition to the same sign condition. Therefore, the judgement of demodulation is frequent and the delay time of demodulation output from the original data change can be reduced and the variation of the data due to noise can be prevented. Accordingly, a receiving sensitivity of an FSK signal having a low modulation Index can be improved. In this embodiment, times of the judgement per data is a half of the first embodiment. However, if the received FSK signal has a larger modulation index to some extent, the demodulation operation according to this embodiment is possible. On the other hand, the number of parts used in the direct conversion receiver of the second embodiment is less than that of the first embodiment.

Figure 4B:
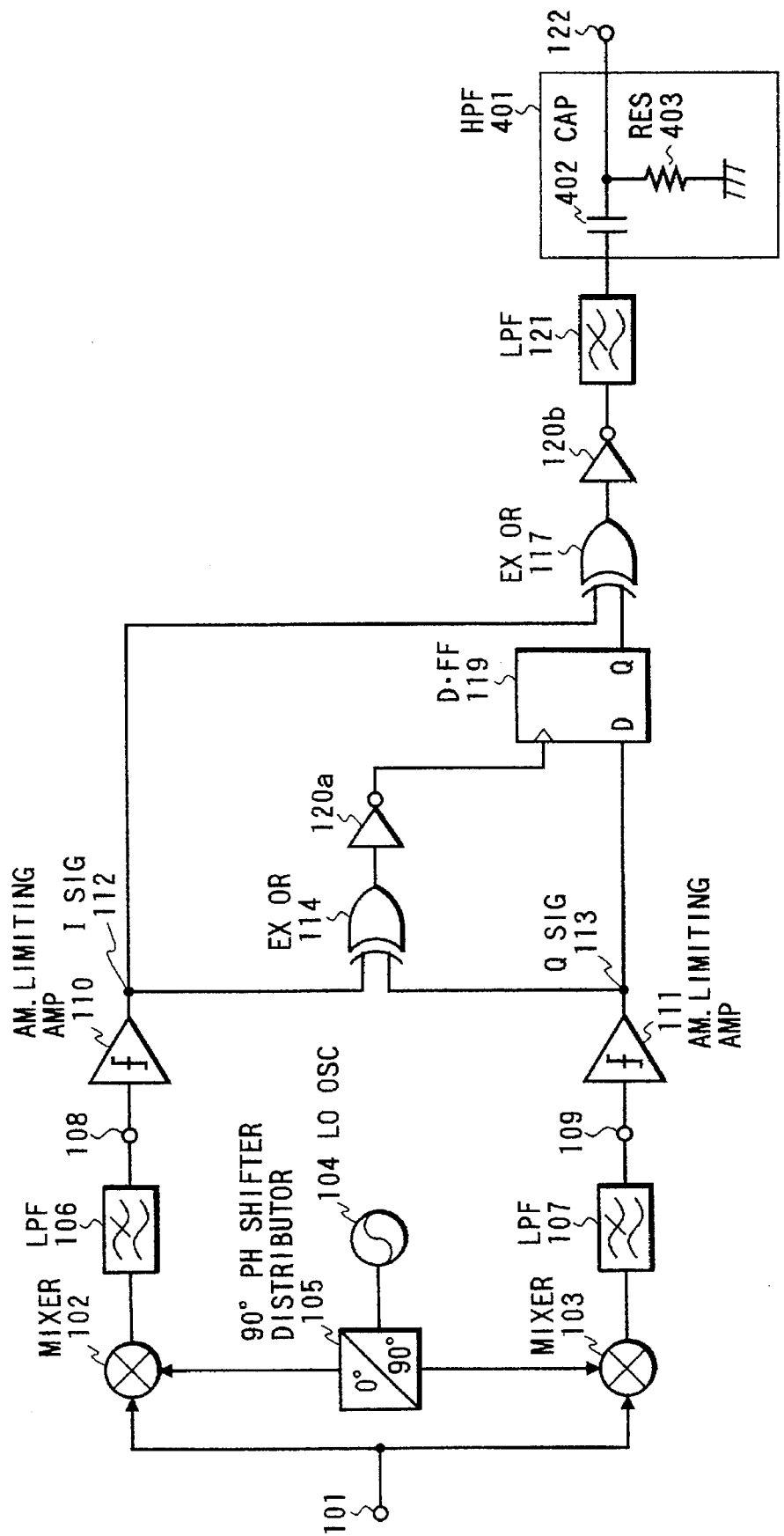
FIG. 4B is a block of a modification of the second embodiment.

FIG. 4B is a block diagram of a modification of the second embodiment. In this embodiment, the D flip flop 119 used in the first embodiment is removed. However, it is also possible that the D flip flop 118 is removed instead of the D flip and the first input of the EXCLUSIVE OR circuit 117 is supplied with the digital I signal 112 and the second input EXCLUSIVE OR circuit 117 is supplied with the Q output of the D flip flop circuit 119 and an inverter 120b is provided between the EXCLUSIVE OR circuit 117 and the low pass filter 121, so that the D flip flop circuit 119 holds and outputs the logic level at the D input when the sign condition of the digital I signal 112 and the digital Q signal 113 changes from the difference signal condition to the same sign condition.

Figure 6:
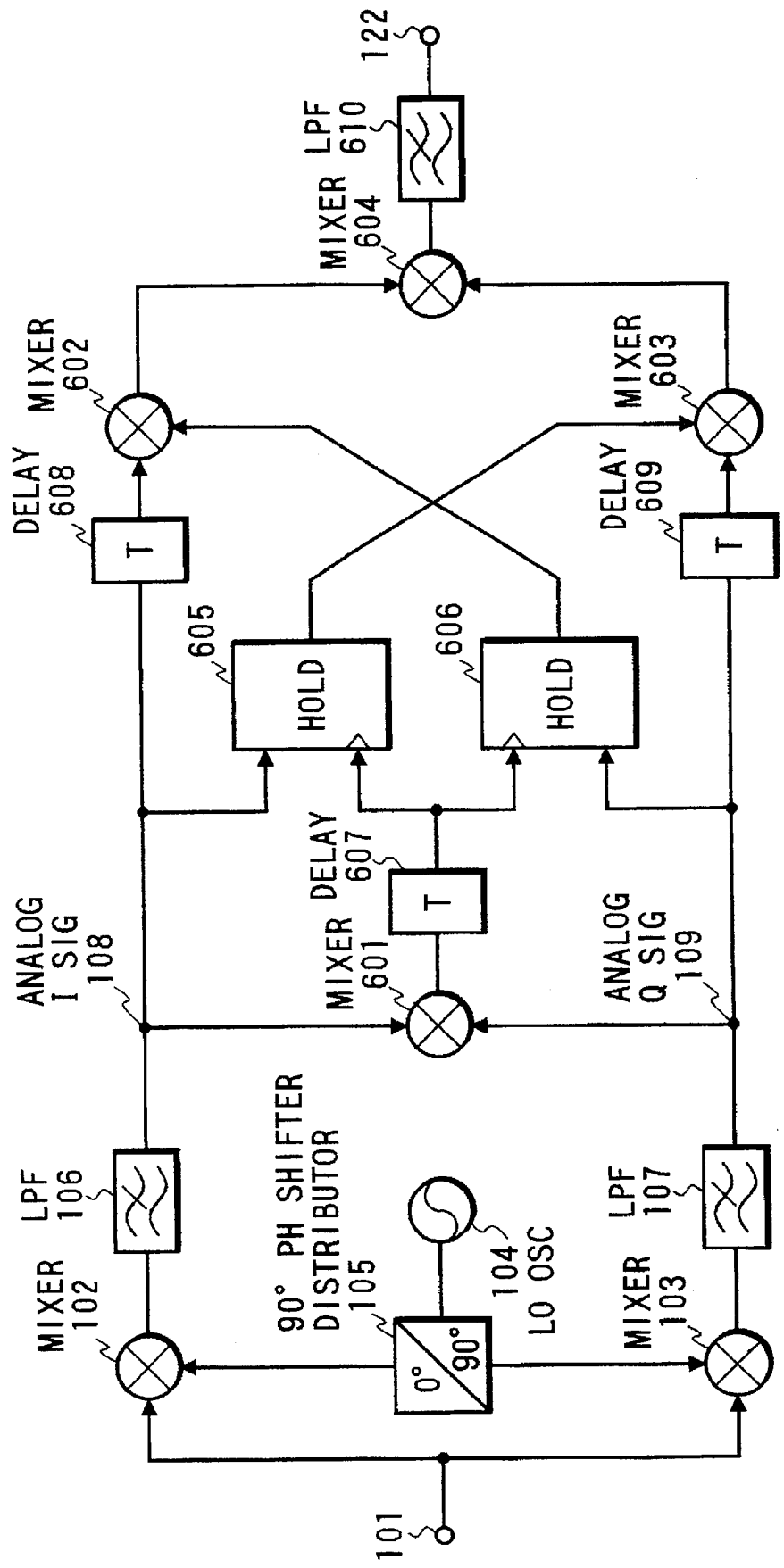
FIG. 6 is a block diagram of a third embodiment of a direct conversion receiver.
Figure 7:
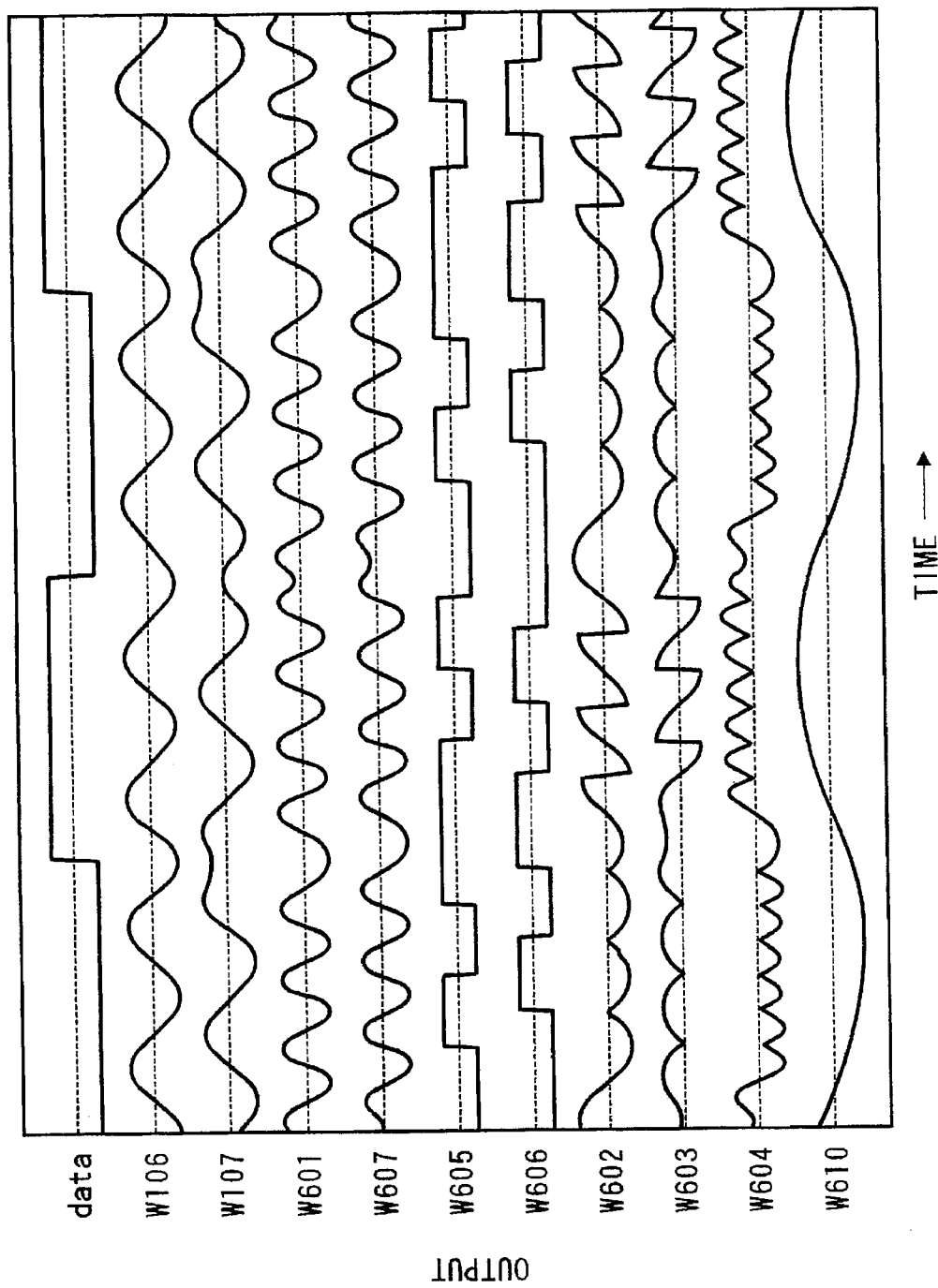
FIG. 7 is a drawing of a time chart of the third embodiment.

A third embodiment will be described. FIG. 6 is a block diagram of the third embodiment of a direct conversion receiver. FIG. 7 is a drawing of a time chart of the third embodiment. In FIG. 7, waveforms represent outputs of circuits shown in FIG. 6 with references respectively corresponding to references of those circuits.

The direct conversion receiver of the third embodiment has a portion common to the first embodiment. That is, the structure of the third embodiment providing the analog I signal 108 and the analog Q signal 109 is the same as that of the first embodiment. The analog I signal 108 is supplied to a first input of a mixer 601, a holding circuit 605, and a delay circuit 608. The analog Q signal 109 is supplied to a second input of the mixer 601, a holding circuit 606, and a delay circuit 609. The mixer 601 mixes the analog I signal 108 with the analog Q signal 109 and supplies a second frequency shift signal (w601) to a delay circuit 607. The delay circuit 607 delays an analog signal of the second frequency shift signal by a delay time corresponding to $\pi/4$ of a deviation frequency of the received FSK signal. The holding circuit 605 holds a level of the analog I signal in response to a transition from a negative polarity to a positive polarity of the output of the delay circuit 607. The holding circuit 606 holds a level of the analog Q signal in response to the transition from the positive polarity to the negative polarity of the output of the delay circuit 607. The delay circuit 608 delays the analog I signal 108 by a delay time corresponding to $\pi/4$ of the deviation frequency of the received FSK signal. Similarly, the delay circuit 609 delays the analog Q signal 108 by a delay time corresponding to $\pi/4$ of the deviation frequency of the received FSK signal. The mixer 602 multiplies an output of the delay circuit 608 by an output of the holding circuit 606. The mixer 603 multiplies an output of the delay circuit 609 by an output of the holding circuit 605. The mixer 604 multiplies an output of the mixer 602 by an output of the mixer 603. A low pass filter 610 removes unnecessary high frequency components and outputs a demodulation output 122. The mixers 601 to 604 comprise analog multipliers respectively.

An operation of the third embodiment will be described.

The analog I signal 108 and the analog Q signal 109 have frequencies equivalent to the deviation frequency of the received FSK signal 101 respectively and a phase difference of 90 degrees each other. Therefore, the mixer 601 multiplying the analog I signal 108 with the analog Q signal 109 generates the second frequency shift signal having a frequency twice those of the analog I signal 108 and the analog Q signal 109 as shown by an waveform w601. The delay circuit 607 delays the second frequency shift signal by the delay time corresponding to $\pi/2$ of a deviation frequency of the second phase shift signal, that is, a delay time corresponding to $\pi/4$ of the deviation frequency of the received FSK signal. The holding circuit 605 holds the level of the analog I signal 108 at the transition from the negative polarity to the positive polarity of the output of the delay circuit 607 as shown by waveform w605 and supplies the hold level to the mixer 603. The holding circuit 606 holds the level of the analog Q signal 109 at the transition from the positive polarity to the negative polarity of the output of the delay circuit 607 as shown by waveform w606 and supplies the hold level to the mixer 602. The delay circuit 608 delays the analog I signal 108 by the delay time which is the same as the delay time of the delay circuit 607. Similarly, the delay circuit 609 delays the analog Q signal 109 by the delay time which is the same as the delay time of the delay circuit 607. The mixer 602 multiplies the output of the delay circuit 608 by the output of the holding circuit 606 and the mixer 603 multiplies the output of the delay circuit 609 by the output of the holding circuit 605 as shown by waveforms w602 and w603 respectively. The mixer 604 multiplies the output of the mixer 602 by the output of the mixer 603 as shown by waveform w804. The low pass filter 610 provides the demodulation output 122 as shown by waveform w610 from the output of the mixer 604 with unnecessary high frequency components removed.

As mentioned above, the direct conversion receiver of the third embodiment provides the demodulation output as similar to the direct conversion receiver of the first embodiment. However, in this embodiment, demodulation operation is made through an analog technique, so that the necessity of the amplitude limiting amplifiers 110 and 111 is eliminated.

Figure 8:
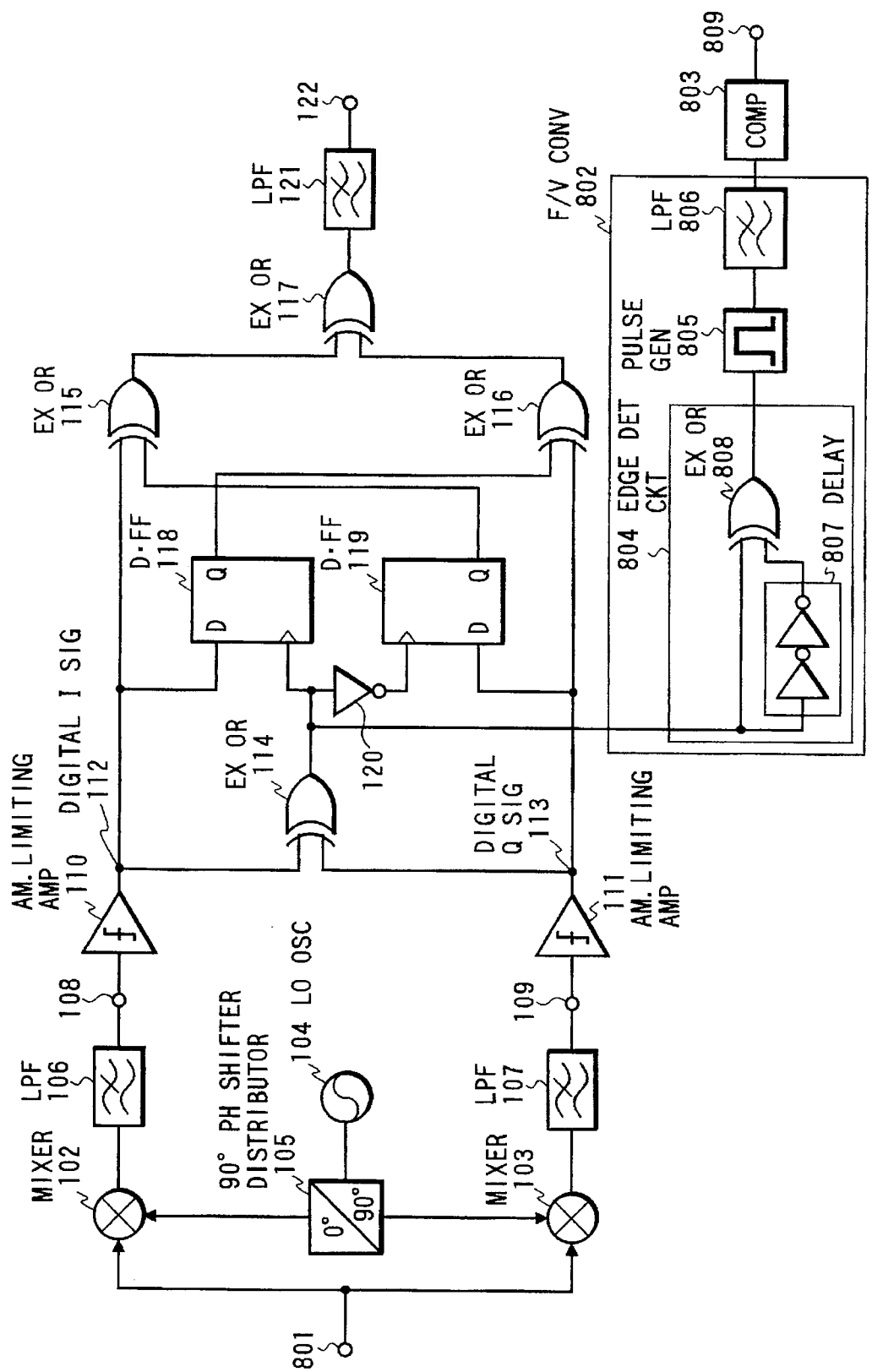
FIG. 8 is a block diagram of a fourth embodiment of a direct conversion receiver.

A fourth embodiment will be described. FIG. 8 is a block diagram of a direct conversion receiver of the fourth embodiment. The direct conversion receiver of the fourth embodiment demodulates a four value FSK signal. The basic structure of the fourth embodiment is the same as that of the first embodiment. That is, a first bit of the fourth value FSK signal is outputted from the low pass filter 121 as similar to the first embodiment. On the other hand, the second bit of the fourth value FSK signal is obtained as follows:

The output of the EXCLUSIVE OR circuit 114 is supplied to an F/V converter 802 for converting a frequency of the output of the EXCLUSIVE OR circuit 114 into a voltage signal. An output of the F/V converter 802 is supplied to a comparing circuit 803 for comparing the voltage signal with a threshold voltage to output the second bit of the four value FSK signal.

The F/V converter 802 comprises an edge detection circuit 804 having a delay circuit 807 for delaying the output of the EXCLUSIVE OR circuit 114 with a short delay interval and an EXCLUSIVE OR circuit 808 for effecting an EXCLUSIVE OR operation between the output of the EXCLUSIVE OR circuit 114 and an output of the delay circuit 807, a pulse generator 808 for generating a pulse having a predetermined pulse width in response to an output of the edge detection circuit 804, and a low pass filter 806 for effecting an integration of the pulse from the pulse generator 805.

The basic structure of the fourth embodiment operates similar to the first embodiment. That is, the first bit is demodulated by judging the frequency shift direction, namely, judging as to whether the frequency shift is the positive side or the negative side with respect to the carrier frequency the received four value FSK signal 801. The second bit is demodulated by judging the amount of frequency shift of the received four value FSK signal as follows:

The digital I signal 112 and the digital Q signal 113 have the same frequency and the phase difference of 90 degrees. As mentioned above, the EXCLUSIVE OR 114 effects the EXCLUSIVE OR operation which is equivalent to multiplying the digital I signal 112 and the digital Q signal 113, so that the output of the EXCLUSIVE OR circuit 114 includes a component having a frequency twice the frequency shift of the four value FSK signal 801. Therefore, the amount of frequency shift is converted into the voltage signal by the F/V converter 802 and the comparator 803 compares the voltage signal with the reference voltage to judge and output the second bit of the four value FSK signal.

An operation of the F/V converter 802 will be described.

The output of the EXCLUSIVE OR circuit 114 is supplied to the edge detection circuit 804 having the delay circuit 807 and the first input of the EXCLUSIVE OR circuit 808. The delay circuit 807 delays the output of the EXCLUSIVE OR circuit 114 with the short delay interval. The EXCLUSIVE OR circuit 808 effects an EXCLUSIVE OR operation between the output of the EXCLUSIVE OR circuit 114 and an output of the delay circuit 807 to detect an edge in the output of the EXCLUSIVE OR circuit 114. The pulse generator 805 generates the pulse having the predetermined pulse width in response to the output of the edge detection circuit 804. The low pass filter 806 integrates the pulse from the pulse generator 805 to output the voltage signal. As mentioned above, in the fourth embodiment, the first bit is judged in accordance with the detected frequency shift direction and the second bit is judged in accordance with the detected amount of frequency shift. Therefore, the four value FSK signal is demodulated.

In this embodiment, the four value FSK signal is demodulated. However, a multi-value FSK signal can be demodulated by modification of the comparator 803 to have a multi-reference voltages.

As mentioned above, the demodulation output is obtained using the values of the I digital signal 112 and the Q digital signal 113 when the digital I signal 112 and the digital Q signal 113 change from the same signal condition to the different sign condition or from the different sign condition to the same sign condition. Therefore, the judgement of demodulation is frequent and the delay time of demodulation output from the original data change can be reduced and the variation of the data due to noise can be prevented. Accordingly, a receiving sensitivity of an FSK signal having a low modulation index can be improved.

A fifth embodiment will be described.

Figure 9:
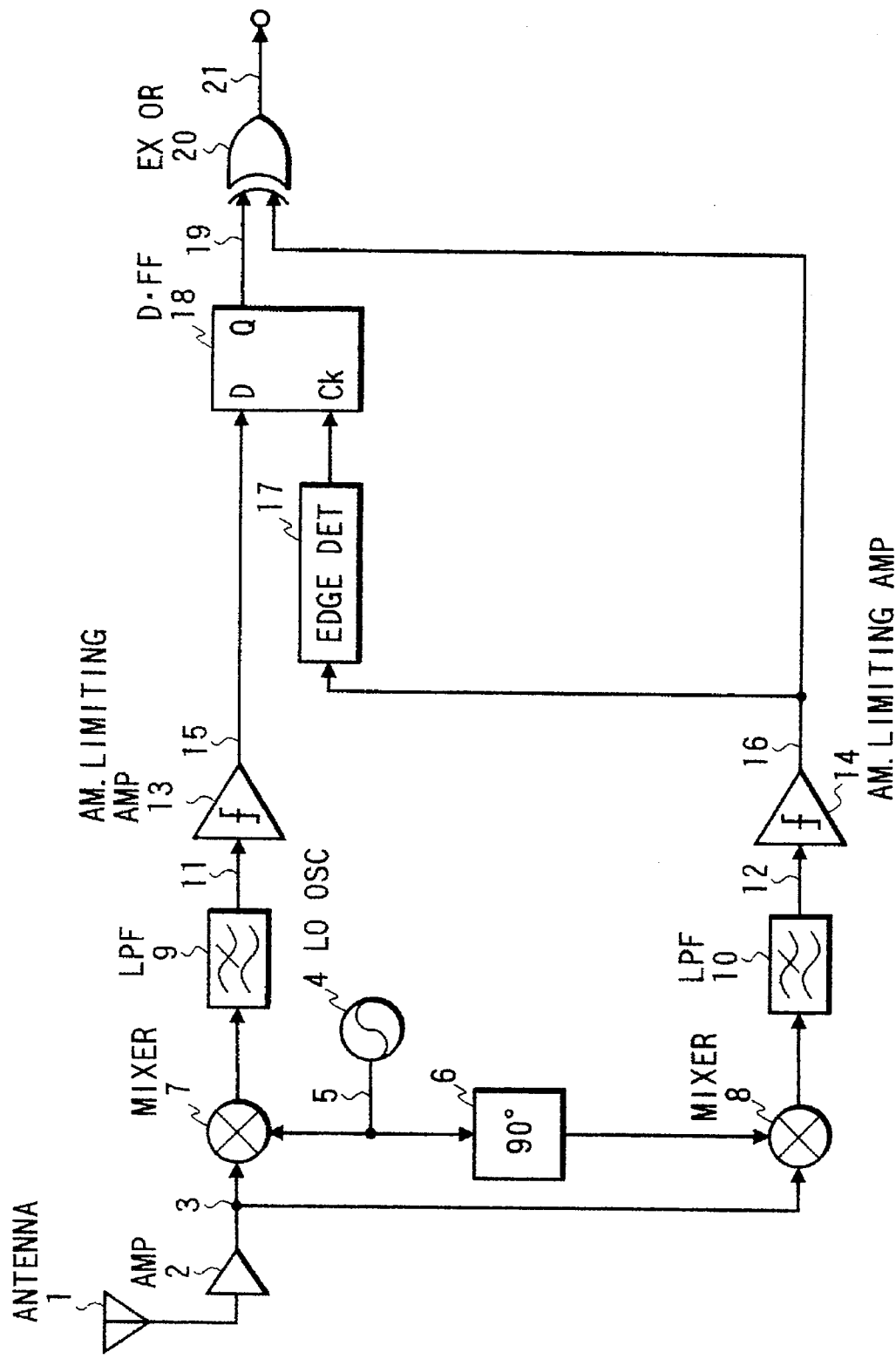
FIG. 9 is a block diagram of a fifth embodiment of a direct conversion receiver.
Figure 10:
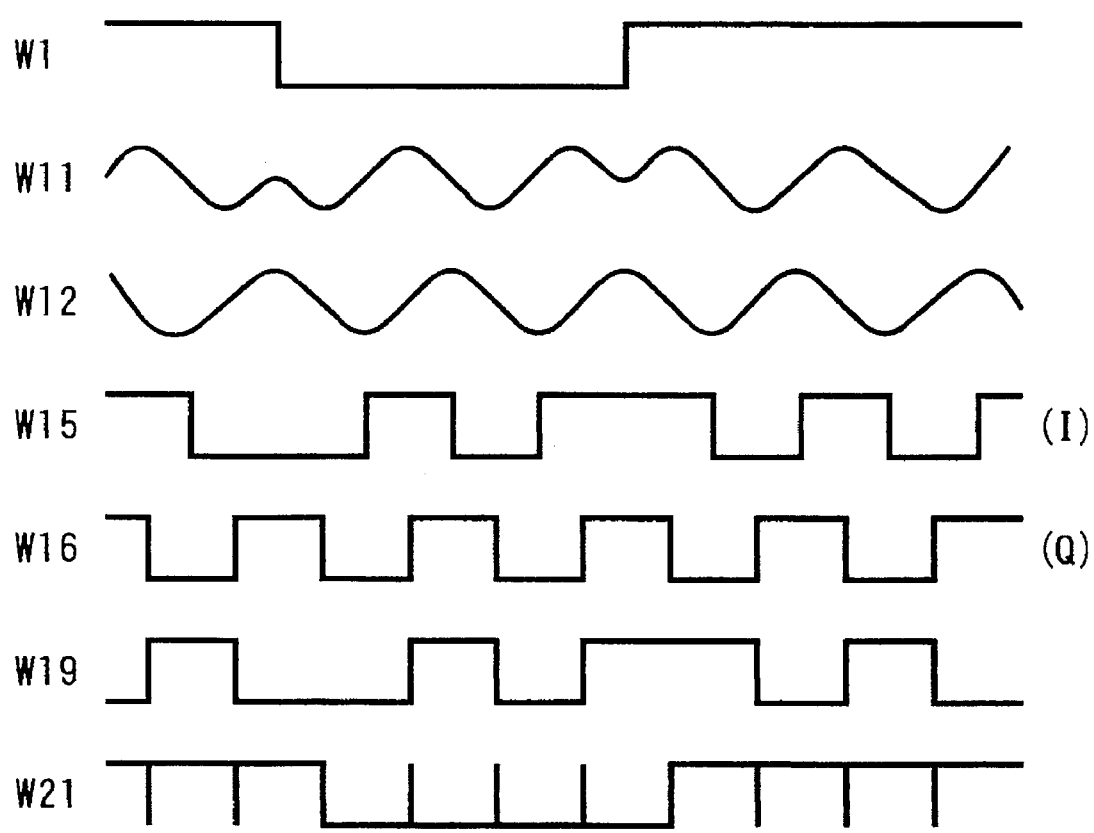
FIG. 10 is a time chart of the fifth embodiment showing waveforms of outputs of respect portions of fifth embodiment.

FIG. 9 is a block diagram of the fifth embodiment of a direct conversion receiver. FIG. 10 is a time chart of the fifth embodiment showing waveforms of outputs of respect portions in FIG. 9. In FIG. 10, waveforms represent signals shown in FIG. 9 with references respectively corresponding to references of those signals except waveform w1 of data.

A radio wave FSK signal is received by an antenna 1. An amplifier 2 amplifies the received FSK signal. The received FSK signal 3 from the amplifier 2 is supplied to mixers 7 and 8. A local oscillator 4 generates a local oscillation signal having a frequency which is substantially the same as a carrier frequency of the FSK signal. The local oscillation signal is supplied to the mixer 7 and to a 90° phase shifter 6. The 90° phase shifter 6 supplies a 90° phase shifted local oscillation signal to the mixer 8, wherein it is assumed that the local oscillation signal supplied to the mixer 7 leads the 90° phase shifted local oscillation signal supplied to the mixer 8 by a phase angle 90° The mixer 7 mixes the received FSK signal 3 from the amplifier 2 with the local oscillation signal and the mixer 8 mixes the received FSK signal 3 from the amplifier 2 with the 90° phase shifted local oscillation signal. The outputs of the mixers 7 and 8 are supplied to low pass filters 9 and 10 respectively. The low pass filter 9 and 10 remove unnecessary high frequency components from the output of the mixers 7 and 8. Outputs of the low pass filters 9 and 10 are analog I and Q signals as shown by waveforms w11 and w12 and are supplied to limiting amplifiers 13 and 14 respectively. The amplitude limiting amplifier 13 amplifies the output of the low pass filter 9 with amplitude limitation to supply a digital in-phase base band signal (digital I signal) 15 as shown by waveform w15. The amplitude limiting amplifier 14 amplifies the output of the low pass filter 10 with amplitude limitation to supply a digital quadrature base band signal (digital Q signal) 16 as shown by waveform w16. The I and Q signals have a quadrature phase relation which is inverted by the frequency shift of the FSK signal.

The output of the amplitude limiting amplifier 13 (digital I signal) is supplied to a D input of a D flip flop circuit 18. The output of the amplitude limiting amplifier 14 (digital Q signal) is supplied to an edge detection circuit 17. The edge detection circuit 17 detects an edge in the digital Q signal and supplies an edge detection signal to a clock input of the D flip flop circuit 18. The D flip flop circuit 18 holds and outputs a level of the digital I signal 15 in response to the edge detection signal at a Q output thereof. The Q output of the D flip flop circuit 18 is supplied to a first input of an EXCLUSIVE OR circuit 20 and the edge detection signal is supplied to a second input of the EXCLUSIVE OR circuit 20. The EXCLUSIVE OR circuit 20 effects an EXCLUSIVE OR operation between the Q output of the D flip flop circuit 18 and the edge detection signal 17a.

The digital I and Q signals are provided as similar to the first embodiment. Then, an operation of demodulation from the digital I and Q signals will be described.

Analog I and Q signals 11 and 12 have a phase difference of 90 degrees and a lead and lag relation therebetween changes in accordance with the data (w1) to be transmitted as shown by waveforms w11 and w12. Therefore, the digital I and Q signal 15 and 16 also have the phase difference of 90 degrees. Therefore, a binary signal 19 having a phase lag of 90 degrees from the digital I signal 15 is equivalently provided by holding a level of the digital I signal 15 at the level change timings of the digital Q signal 16. This level change timings are detected by the edge detection circuit 17 by detecting rising and falling edges in the digital Q signal. The edge detection circuit 17 generates a pulse having a short pulse width and supplies it to the clock input of the D flip flop circuit 18. The D flip flop circuit 18 holds the level of the digital I signal 15 in response to the rising and falling edges of the digital Q signal and outputs the binary signal 19 having a phase lag of 90 degrees from the digital I signal 15 at the Q output.

When the digital Q signal 16 lags the digital I signal 15 in accordance with the data, the binary signal 19 having the phase lag of 90 degrees from the digital I signal 15 is in phase with the digital Q signal. Therefore, the EXCLUSIVE OR circuit 20 outputs logic L.

On the other hand, when the digital Q signal 16 leads the digital I signal 15 in accordance with the data, the binary signal 19 having the phase lag of 90 degrees from the digital I signal 16 has a phase lead from the binary signal 19 by 180 degrees. Therefore, the EXCLUSIVE OR circuit 20 outputs logic H. Accordingly, these operations provides the phase relation between the digital I signal 15 and digital Q signal 16 are provided and these result provide the demodulation of this direct conversion receiver.

Figure 11:
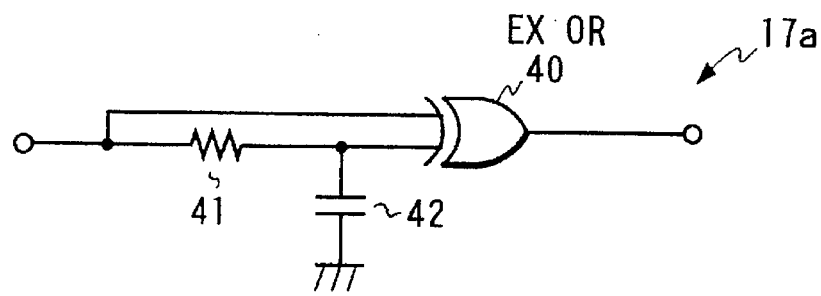
FIG. 11 is a block diagram of a first example of an edge detection circuit in the fifth embodiment.

FIG. 11 is a block diagram of a first example of the edge detection circuit 17a in the fifth embodiment. The edge detection circuit 17a comprises an EXCLUSIVE OR circuit 40, a resistor 41, and a capacitor 42. The input of the edge detection circuit 17a is supplied to a first input of the EXCLUSIVE OR circuit 40 and to the second input of the EXCLUSIVE OR circuit 40 through the resistor 41. A coupling point between the resistor 41 and the second input of the EXCLUSIVE OR circuit 40 is grounded through a capacitor 42. An integration circuit including the resistor 41 and the capacitor 42 delays the input of the edge detection circuit with a delay time. Therefore, the EXCLUSIVE OR circuit 40 outputs logic H for a time period corresponding to the delay time as the edge detection signal.

Figure 12:
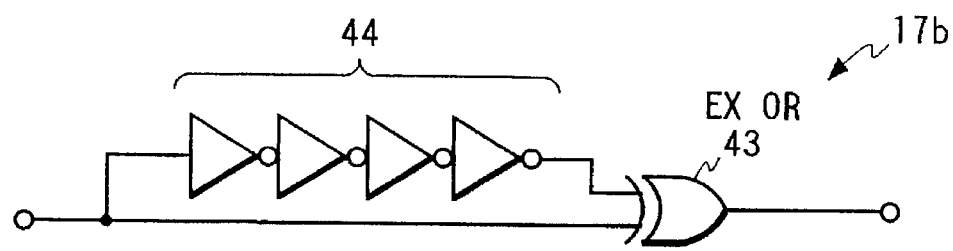
FIG. 12 is a block diagram of a second example of the edge detection circuit in the fifth embodiment.

FIG. 12 is a block diagram of a second example of the edge detection circuit 17 in the fifth embodiment. The edge detection circuit 17b comprises an EXCLUSIVE OR circuit 43, an even number of inverters 42.

The input of the edge detection circuit 17b is supplied to a first input of the EXCLUSIVE OR circuit 43 through the inverters 44 connected in series and is directly supplied to a second input of the EXCLUSIVE OR circuit 43. The even number of inverters 44 delays the input of the edge detection circuit 17b with a sum of delay times in respective inverters 44. Therefore, the EXCLUSIVE OR circuit 43 outputs logic H for a time period corresponding to the delay times in the even number of inverters 44 as the edge detection signal.

Figure 13:
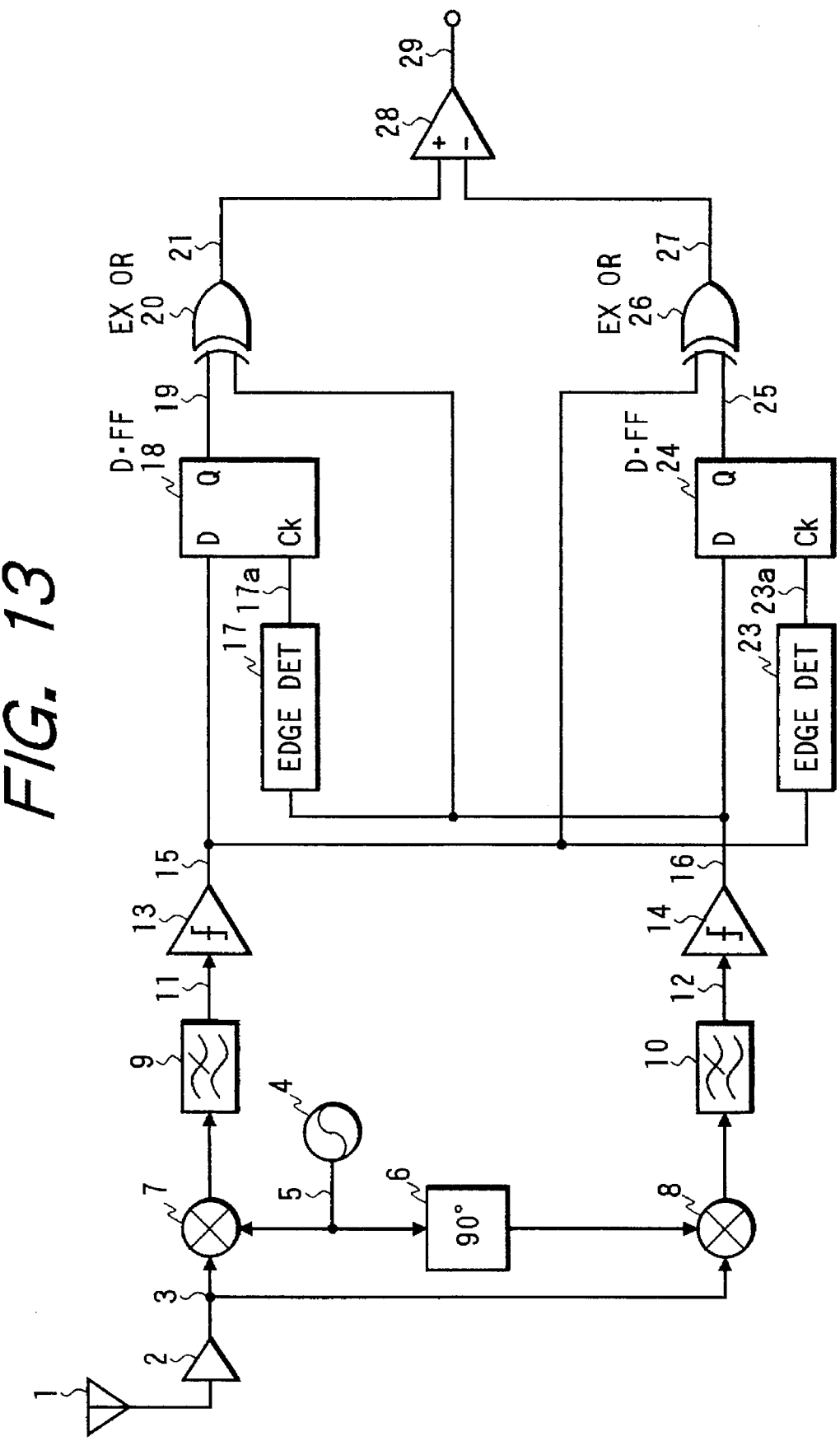
FIG. 13 is a block diagram of the sixth embodiment of a direct conversion receiver.

A sixth embodiment will be described. FIG. 13 is a block diagram of the sixth embodiment of a direct conversion receiver.

The basic structure is similar to the fifth embodiment. That is, the direct conversion receiver of the sixth embodiment comprises, in addition to the structure of the fifth embodiment, an edge detection circuit 23 for detecting an edge in the digital I signal and generating an edge detection signal 23a, a D flip flop circuit 24, supplied with digital Q signal 16 and the edge detection signal 23a, for holding and outputting a level of the digital Q signal 16 in response to the edge detection signal 23a at a Q output thereof, an EXCLUSIVE OR circuit 26, supplied with a Q output of the D flip flop circuit 24 and the digital I signal, and a subtracting circuit 28 for subtracting the output of the EXCLUSIVE OR circuit 26 from the EXCLUSIVE OR circuit 21 to provide a demodulation output.

The edge detection circuit 17, the D flip flop circuit 18, and the EXCLUSIVE OR circuit 20 operate in the same way as those of the fifth embodiment and the edge detection circuit 23, the D flip flop circuit 24, and the EXCLUSIVE OR circuit 25 operate similarly.

That is, the edge detection circuit 23 detects the edge in the digital I signal and generates the edge detection signal 23a. The D flip flop circuit 24, having a D input supplied with digital I signal 15 and a clock input supplied with the edge detection signal 23a, holds and outputs the level of the digital Q signal 16 in response to the edge detection signal 23a at a Q output thereof. The EXCLUSIVE OR circuit 26, supplied with the Q output of the D flip flop circuit 24 and the digital I signal, effects an EXCLUSIVE OR operation between the Q output of the D flip flop circuit 24 and the digital I signal 15. The subtracting circuit 28 subtracts the output of the EXCLUSIVE OR circuit 26 from the EXCLUSIVE OR circuit 21 to combine the first and second demodulation results from the EXCLUSIVE OR circuits 20 and 26 to provide the final demodulation output 29 as shown by a waveform W29.

More specifically, in the direct conversion receiver of the fifth embodiment, the level of the digital I signal is held by only the D flip flop circuit 18 in response to the edge in the digital Q signal. On the hand, in the direct conversion receiver of the sixth embodiment, the level of the digital I and Q signals are held by the D flip flop circuits 18 and 24 in response to the edge in the digital Q and I signals respectively. Therefore, there are provided first and second demodulation results from the EXCLUSIVE OR circuits 20 and 26. However, the first and second demodulation results have an inverted relation. Therefore, the subtracting circuit combines the first and second result into a final result. The first and second results are provided alternately because the first and second results are provided in response to the edges in the digital Q and I signals respectively. Therefore, the delay in the phase detection of the sixth embodiment is a half of the delay in the fifth embodiment.

The first and second demodulation results have an inverted relation as mentioned. This point will be described more specifically.

When the digital Q signal 16 lags the digital I signal 15 in accordance with the data, the binary signal 16 having the phase lag of 90 degrees from the digital I signal 15 has a phase lag of 180 degrees from the digital Q signal. Therefore, the EXCLUSIVE OR circuit 20 outputs logic H.

On the other hand, when the digital Q signal 16 leads the digital I signal 15 in accordance with the data, the binary signal 16 having the phase lag of 90 degrees from the digital I signal 16 is in signal 19. The binary signal 19. Therefore, the EXCLUSIVE OR circuit 26 outputs logic L. Accordingly, these operations provides the phase relation between the digital I signal 15 and digital Q signal 16 and these results provide the second demodulation of this direct conversion receiver. The first demodulation result outputted from the EXCLUSIVE OR circuit 20 has an inverse relation from the second demodulation outputted by the EXCLUSIVE OR circuit 25. Therefore, the subtracting circuit 28 provides the final demodulation result by combining the first and second results.

As mentioned, the final demodulation result is renewed at the both edges in the digital I and Q signals 15 and 16. Therefore, the phase detection rate is twice that of the first embodiment. Accordingly, the delay in the phase detection in the demodulation, that is, a demodulation error is reduced.

The reduction of error in the demodulation result improves the sensitivity of the direct conversion receiving. Therefore, the direct conversion receiver of sixth embodiment has a higher sensitivity. Moreover, the reduction of the delay in the phase detection for demodulation enables an FSK signal having a high data rate, having a more narrow band, or a lower modulation index.

A seventh embodiment will be described.

Figure 14:
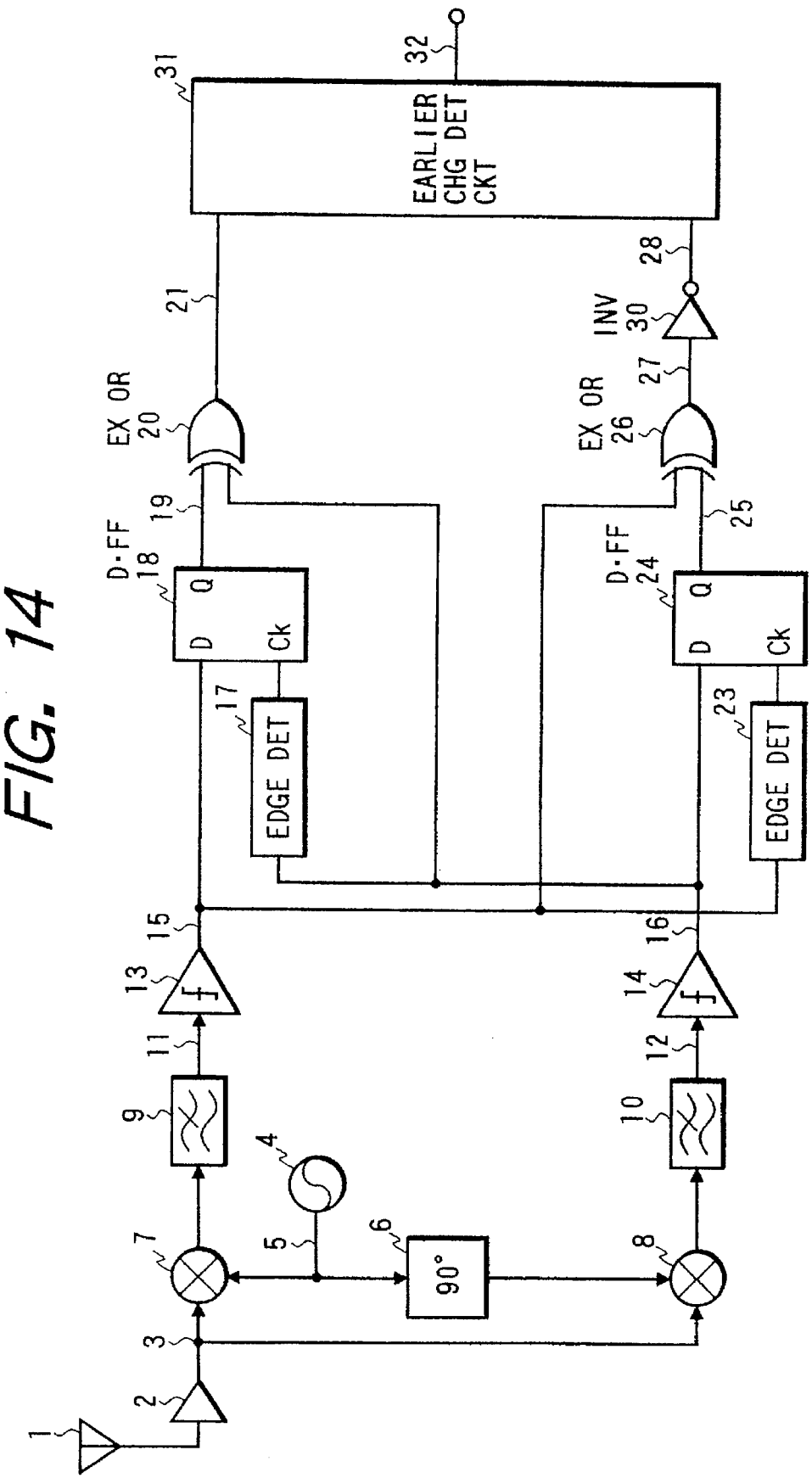
FIG. 14 is a block diagram of the seventh embodiment of a direct conversion receiver.
Figure 16:
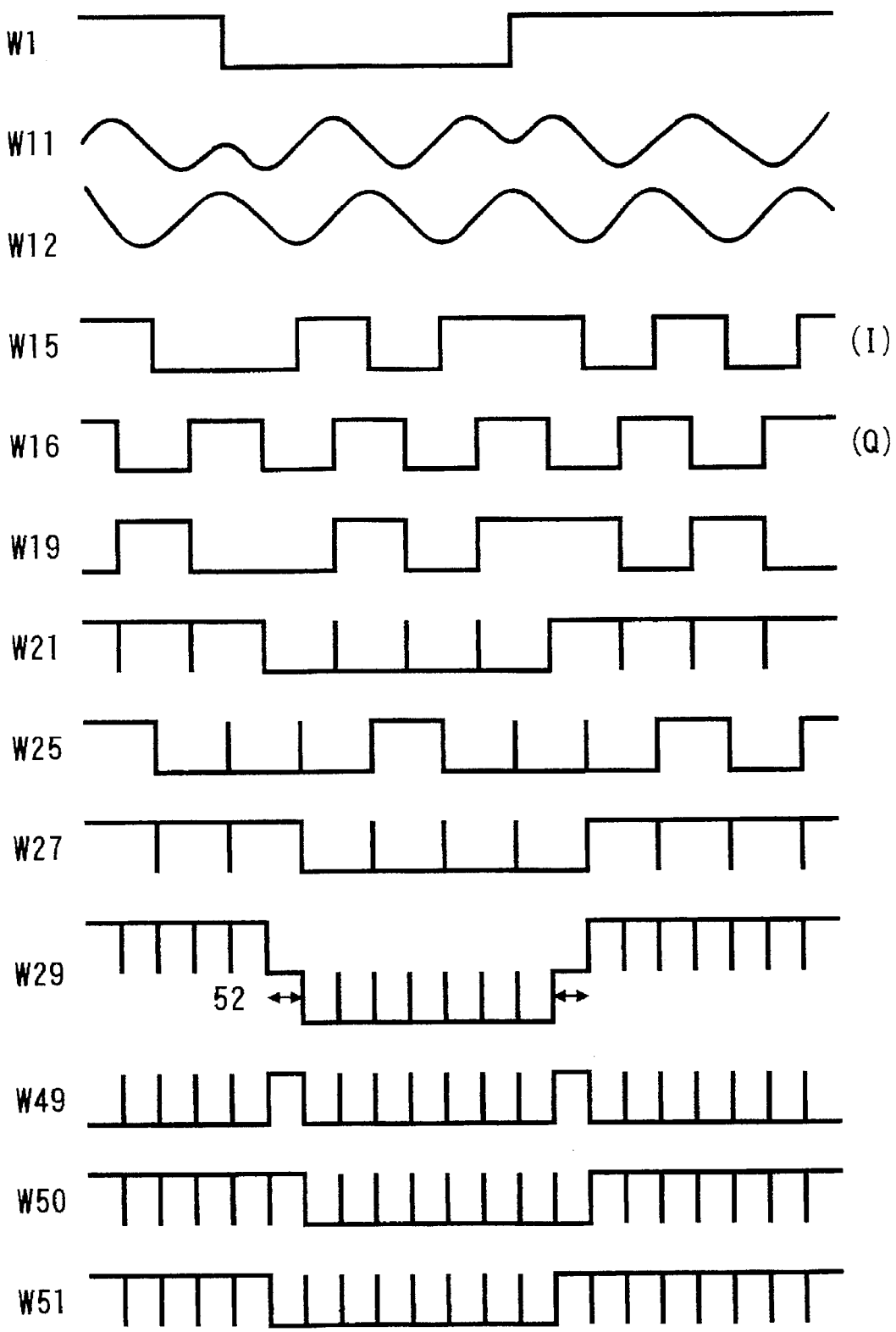
FIG. 16 is a time chart of the seventh embodiment showing waveforms of outputs of respect portions in FIG. 14.
Figure 17:
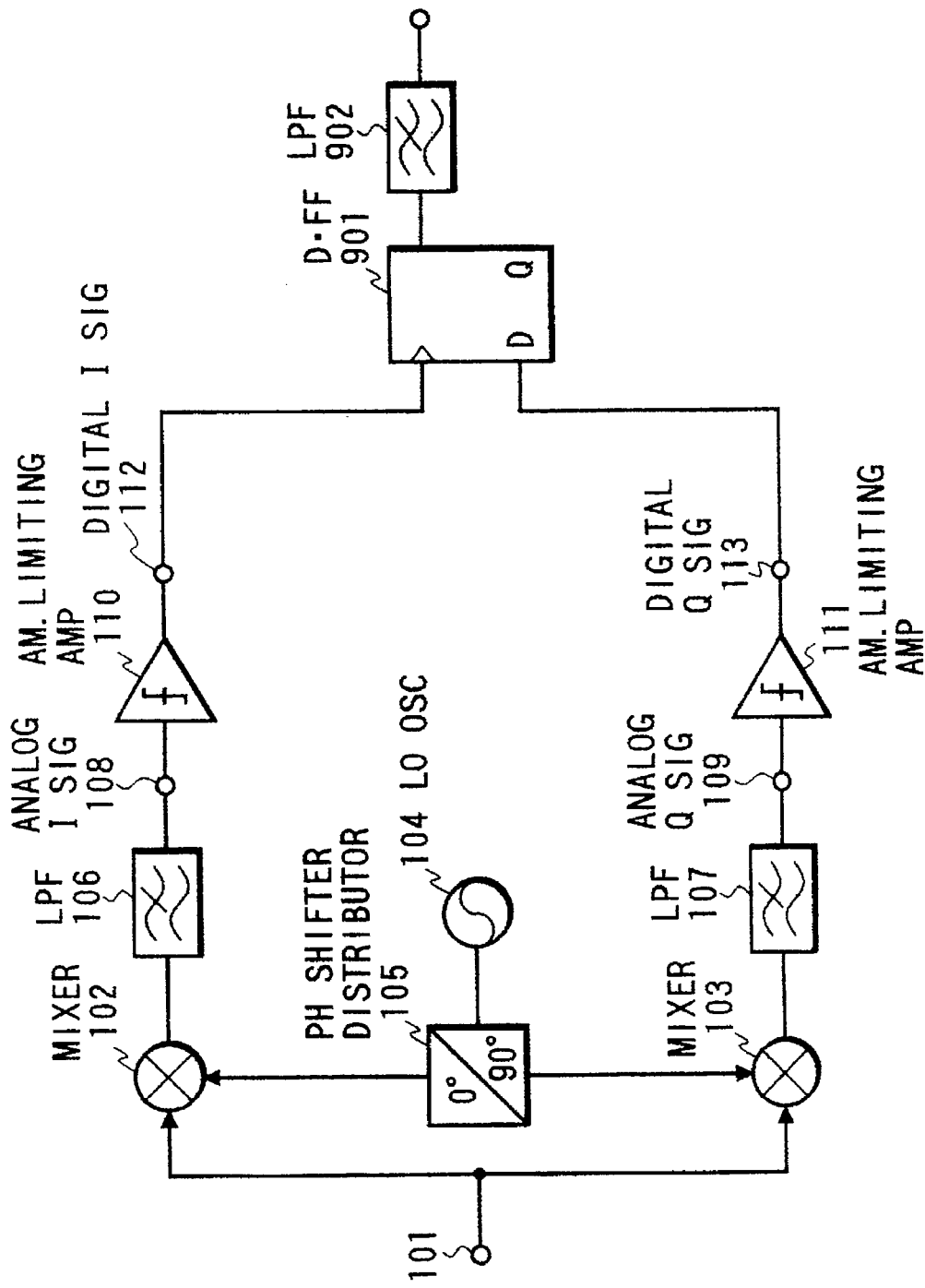
FIG. 17 is a block diagram of a prior art direct conversion receiver.

FIG. 14 is a block diagram of the seventh embodiment of a direct conversion receiver. FIG. 16 is a time chart of the seventh embodiment showing waveforms of outputs of respect portions in FIG. 14. In FIG. 16, waveforms represent signals shown in FIG. 14 with references respectively corresponding to references of those signals except waveform w1 of data. The basic structure of the seventh embodiment is similar to the sixth embodiment. That is, the subtracting circuit 28 of the sixth embodiment is replaced by an inverter 30 for inverting an output of the EXCLUSIVE OR circuit 26 and an earlier change detection circuit 31 for detecting earlier change in the first demodulation result 21 from the EXCLUSIVE OR circuit 20 and an inverted second demodulation result from the inverter 30 to provide another final result with further reduction in the delay of the phase detection.

As described in the sixth embodiment, the first demodulation result 21 and the second demodulation result have opposite signs. Therefore, the inverter 30 is provided to match the polarity of signals indicative of the first and second demodulation results 21 and 27. However, the inverter may be provided in the earlier change detection circuit 31. The first demodulation result 21 and the inverted second result 28 are supplied to the earlier change detection circuit 31.

As described in the sixth embodiment, the first and second demodulation results 21 and 27 change alternately in response to the edges in the digital Q and I signals 10 and 15 respectively. Therefore, when data changes, one of the first and second demodulation results changes its sign and then, the other demodulation result changes its sign. Therefore, while only one of first and second demodulation result changes, the demodulation results are indefinite. More specifically, earlier change in the first or second demodulation result represents the change in the data. Therefore, the earlier change detection circuit detects an earlier change in the first or second demodulation result and changes the second final result in response to the detection of the earlier change. In other words, either the first demodulation result leads the second demodulation result by a phase difference between the digital in-phase and quadrature signals or the second demodulation result leads the first demodulation result by the phase difference between the digital in-phase and quadrature signals. Therefore, the second final results 32 represents one of first or second demodulation results leading the other. Then, the indefinite period 52 is eliminated in the second demodulation result, so that the delay in the phase detection for the demodulation is reduced.

Figure 15:
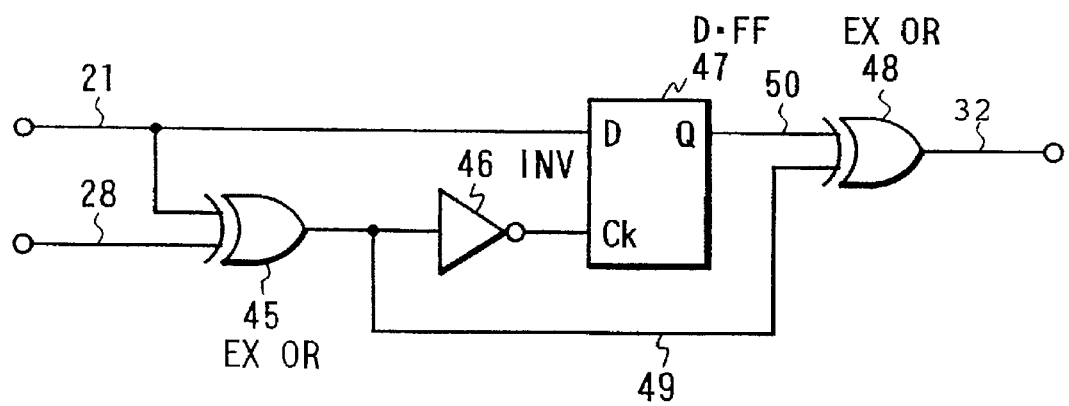
FIG. 15 is a block diagram of the earlier change detection circuit shown in FIG. 14.

FIG. 15 is a block diagram of the earlier change detection circuit 31 shown in FIG. 14. The earlier change detection circuit 31 comprises an EXCLUSIVE OR circuit 4S supplied with the first demodulation result 21 and the inverted second result 28 for effecting an EXCLUSIVE OR operation between the first demodulation result 21 and the inverted second result 28 to generate a change detection signal 49 as shown by the waveform w49 in FIG. 16, a D flip flop 47 for holding the first demodulation result 21 in response to the change detection signal 49 which is supplied to a clock input of the D flip flop circuit 47 through an inverter 46, and an EXCLUSIVE OR circuit 48 for effecting EXCLUSIVE OR operation between the held first demodulation result 21 and the change detection signal 49 to provide the second final result 51 as shown by the waveforms w49, w50, and w51.

That is, the earlier change detection circuit 31 detects the earlier change in the first or second demodulation result and changes the second final result in response to the detection of the earlier change. In other words, when the both inputs show the same sign, the earlier change detection circuit 31 outputs the sign as the second final result and when one of two inputs changes the sign, it outputs the changed sign as the second final result. More specifically the earlier change detection circuit 31 detects a change in the first and second demodulation results and outputs a second final demodulation result 32 such that when the first demodulation result leads the second demodulation result by the phase difference, the earlier change detection circuit 31 outputs the first demodulation result as the second final demodulation result and when the second demodulation result leads the first demodulation result by the phase difference, the earlier change detection circuit 31 outputs the second demodulation result as the second final demodulation result.

Therefore, in the second final result there is no indefinite period, so that the delay in the phase detection is reduced and the demodulation error is also reduced. Moreover, if an FSK signal having an modulation index more than 5, that is, having the data rate relatively low, there is not so large difference in the receiving performance between the direct conversion receivers of the sixth and seventh embodiments. However, if an FSK signal having an modulation index not larger than 3, that is, having the data rate relatively high, there is a difference in the receiving performance between the direct conversion receivers of the sixth and seventh embodiments, namely, the direct conversion receiver of the seventh embodiment provides the demodulation result with the demodulation error reduced.

Further, because the delay in the phase detection is reduced, the allowance in the deviation of the local oscillation frequency becomes larger.

What is claimed is:

1. A direct conversion receiver for demodulating first and second digital signals, having a quadrature relation therebetween, obtained from a received frequency shift keying signal through a direct conversion comprising:

a first EXCLUSIVE OR circuit (114) for effecting a first EXCLUSIVE OR operation between said first and second digital signals;

a first D flip flop circuit (118) for holding a level of said first digital signal in response to a rising edge of an output of the first EXCLUSIVE OR circuit;

a second D flip flop circuit (119) for holding a level of said second digital signal in response to a falling edge of said output of the first EXCLUSIVE OR circuit;

a second EXCLUSIVE OR circuit (115) for effecting a second EXCLUSIVE OR operation between said first digital signal and an output of said second D flip flop circuit;

a third EXCLUSIVE OR circuit (116) for effecting a third EXCLUSIVE OR operation between said second digital signal and an output of said first D flip flop circuit; and a fourth EXCLUSIVE OR circuit (117) for effecting a fourth EXCLUSIVE OR operation between outputs of said second and third EXCLUSIVE OR circuits to output a demodulation result.

2. A direct conversion receiver as claimed in claim 1, further comprising a low pass filter (121) for low-pass filtering said demodulation result.

3. A direct conversion receiver for demodulating first and second digital signals, having a quadrature relation therebetween, obtained from a received frequency shift keying signal through a direct conversion comprising:

a first EXCLUSIVE OR circuit (114) for effecting a first EXCLUSIVE OR operation between said first digital signal and said second digital signal;

a D flip flop circuit (118) for holding a level of said first digital signal in response to a rising edge of an output of the first EXCLUSIVE OR circuit;

a second EXCLUSIVE OR circuit (117) for effecting a second EXCLUSIVE OR operation between an output of said D flip flop circuit and said second digital signal;

a low pass filter circuit (121) for integrating an output of the fourth EXCLUSIVE OR circuit; and a high pass filter circuit (402) for removing a dc component from an output of the low pass filter circuit and outputting a demodulation result.

4. A direct conversion receiver for demodulating first and second digital signals, having a quadrature relation therebetween, obtained from a received frequency shift keying signal through a direct conversion comprising:

a first EXCLUSIVE OR circuit (114) for effecting a first EXCLUSIVE OR operation between said first and second digital signals;

a D flip flop circuit (119) for holding a level of said second digital signal in response to a falling edge of an output of the first EXCLUSIVE OR circuit;

a second EXCLUSIVE OR circuit (117) for effecting a second EXCLUSIVE OR operation between an output of said D flip flop circuit and said first digital signal;

a low pass filter circuit (121) for integrating an output of said second EXCLUSIVE OR circuit; and a high pass filter circuit (402) for removing a dc component from an output of the low pass filter circuit and outputting a demodulation result.

5. A direct conversion receiver for demodulating first and second analog signals, having a quadrature relation therebetween, obtained from a received frequency shift keying signal through a direct conversion comprising:

a first multiplier (601) for multiplying said first analog signal with said second analog signal;

a first delay circuit (607) for delaying an output of said first multiplier by a delay time corresponding to $\pi/4$ of a deviation frequency of said received frequency shift keying signal;

a first holding circuit (605) for holding a level of said first analog signal when a polarity of an output of said first delay circuit changes from a negative polarity to a positive polarity;

a second holding circuit (606) for holding a level of said second analog signal when a polarity of an output of said first delay circuit changes from a positive polarity to a negative polarity;

a second delay circuit (608) for delaying said first analog signal by said delay time;

a third delay circuit (609) for delaying said second analog signal by said delay time;

a second multiplier (602) for multiplying an output of said second delay circuit with an output of said second holding circuit;

a third multiplier (603) for multiplying an output of said third delay circuit with an output of said first holding circuit;

a fourth multiplier (604) for multiplying an output of said second multiplier with an output of said third multiplier; and a low pass filter (610) for removing a dc component from an output of said fourth multiplier to provide a demodulation result.

6. A direct conversion receiver as claimed in claim 1, wherein said frequency shift keying signal is subjected to multi-value frequency shift keying, said direct conversion receiver, further comprising:

a frequency to a voltage converting circuit (802); and a comparing circuit (803) for comparing an output of said voltage converting circuit with at least a reference voltage and outputting another demodulation result, said demodulation result and said another demodulation result providing demodulation of said multi-value frequency shift keying.

7. A direct conversion receiver for demodulating first and second digital signals, having a quadrature relation therebetween, obtained from a received frequency shift keying signal through a direct conversion comprising:

a first edge detection circuit (17) for detecting an edge in said second digital signal;

a first holding circuit (18) for holding a level of the first digital signal in response to an output of said edge detection circuit;

a first EXCLUSIVE OR circuit (20) for effecting an EXCLUSIVE OR operation between said second digital signal and an output of said holding circuit to provide a first demodulation result;

a second edge detection circuit (23) for detecting an edge in said first digital signal;

a second holding circuit (24) for holding a level of the second digital signal in response to an output of said second edge detection circuit;

an EXCLUSIVE OR circuit (26) for effecting an EXCLUSIVE OR operation between said first digital signal and an output of said second holding circuit to provide a second demodulation result; and a subtracting circuit for effecting a subtraction between said first demodulation result and said second demodulation result.

8. A direct conversion receiver for demodulating first and second digital signals, having a quadrature relation therebetween, obtained from a received frequency shift keying signal through a direct conversion comprising:

a first edge detection circuit (17) for detecting an edge in said second digital signal;

a first holding circuit (18) for holding a level of the said first digital signal in response to an output of said first edge detection circuit;

a first EXCLUSIVE OR circuit (20) for effecting a first EXCLUSIVE OR operation between said second digital signal and an output of said first holding circuit to provide a first demodulation result;

a second edge detection circuit (23) for detecting an edge in said first digital signal;

a second holding circuit (24) for holding a level of the said second digital signal in response to an output of said second edge detection circuit;

a second EXCLUSIVE OR circuit (26) for effecting a second EXCLUSIVE OR operation between said first digital signal and an output of said second holding circuit to provide a second demodulation result, either said first demodulation result leading said second demodulation result by a phase difference between said first and second digital signals or said second demodulation result leading said first demodulation result by said phase;

an earlier change detection circuit for detecting a change in said first and second demodulation results and outputting a third demodulation result such that when said first demodulation result leads said second demodulation result by said phase difference, said earlier change detection circuit outputs said first demodulation result as a third demodulation result and when said second demodulation result leads said first demodulation result by said phase difference, said earlier change detection circuit outputs said second demodulation result as said second demodulation result.

9. A direct conversion receiver as claimed in claim 8, wherein said earlier change detection circuit comprising:

a first inverter (30) for inverting said second demodulation result;

a third EXCLUSIVE OR circuit (45) for effecting a third EXCLUSIVE OR operation between said first demodulation result and an output of said first inverter;

a second inverter (46) for inverting an output of said third EXCLUSIVE OR circuit;

a third holding circuit (47) for holding said first demodulation result in response to an output of said second inverter; and a fourth EXCLUSIVE OR circuit (48) for effecting a fourth EXCLUSIVE OR operation between an output of said holding circuit and said output of said third EXCLUSIVE OR circuit.

10. A direct conversion receiver for demodulating digital in-phase and quadrature signals and second, having a quadrature relation therebetween, obtained from a received frequency shift keying signal through a direct conversion, comprises:

sign change detection means for detecting a sign condition of said digital in-phase and quadrature signals;

a first D flip flop circuit for latching a level of said digital in-phase signal when a sign condition of said digital in-phase and quadrature signals moves from the same to different sign conditions;

a second D flip flop circuit for latching a level of said quadrature signal when said sign condition of said digital in-phase and quadrature signals moves from a different to the same sign conditions; and an EXCLUSIVE OR circuit for effecting EXCLUSIVE OR operations among said digital in-phase and quadrature signals to provide a demodulation result.

\* \* \* \* \*